US012790858B2

(12) United States Patent
Hidding et al.

(10) Patent No.: US 12,790,858 B2
(45) Date of Patent: Nov. 10, 2026

(54) ROTARY LATCH WITH DAMPENING AND BARREL RETENTION

(71) Applicant: TriMark Corporation, New Hampton, IA (US)

(72) Inventors: Matthew L. Hidding, Elma, IA (US); Tobias J. Schwickerath, New Hampton, IA (US); Christopher M. Lane, New Hampton, IA (US); Julie M. Houdek, New Hampton, IA (US)

(73) Assignee: TriMark Corporation, New Hampton, IA (US)

( * ) Notice: Subject to any disclaimer, the term of this patent is extended or adjusted under 35 U.S.C. 154(b) by 153 days.

(21) Appl. No.: 18/068,756

(22) Filed: Dec. 20, 2022

(65) Prior Publication Data

US 2024/0200368 A1 Jun. 20, 2024

(51) Int. Cl.

*E05B 77/38* (2014.01)
*E05B 79/08* (2014.01)
*E05B 85/26* (2014.01)

(52) U.S. Cl.

CPC .............. *E05B 77/38* (2013.01); *E05B 79/08* (2013.01); *E05B 85/26* (2013.01); *E05Y 2900/531* (2013.01)

(58) Field of Classification Search

CPC .......... E05B 77/36; E05B 77/38; E05B 81/90; E05B 85/02; E05B 79/04; E05B 79/08; E05B 79/10; E05B 79/16; E05B 79/22; E05B 77/28

See application file for complete search history.

(56) References Cited

U.S. PATENT DOCUMENTS 3,592,495 A * 7/1971 Fisher ...................... D06F 39/12 292/76
3,848,911 A * 11/1974 Watermann ............. E05B 77/38 292/216
4,073,519 A * 2/1978 Kurozu ................. E05B 85/243 292/216

(Continued)

FOREIGN PATENT DOCUMENTS

CN 103670069 A * 3/2014
CN 110173170 A * 8/2019 ............. E05B 77/38

(Continued)

OTHER PUBLICATIONS

Espacenet, machine translation of CN 103670069, generated Nov. 19, 2024 (Year: 2024).*

(Continued)

*Primary Examiner* — Kristina R Fulton
*Assistant Examiner* — Emily G. Brown
(74) *Attorney, Agent, or Firm* — McKee, Voorhees & Sease, PLC

(57) ABSTRACT

A rotary latch assembly for a vehicle door includes a rotor and a catch mounted between front and rear latch plates with a spring bias for movement between opening and closing positions. A noise dampening bumper resides between the plates to engage the rotor during opening and closing movements for soft opening and closing. An actuator barrel, for releasing the catch from the closed position to the open position, is snap fit between the plates, to eliminate use of a mounting clip.

13 Claims, 22 Drawing Sheets

(56) References Cited

U.S. PATENT DOCUMENTS

| | | | | | |
|---|---|---|---|---|---|
| 4,586,737 | A * | 5/1986 | Arlauskas | E05B 85/243 292/216 |
| 4,679,836 | A * | 7/1987 | Pupillo | E05B 77/38 292/216 |
| 4,703,961 | A | 11/1987 | Weinerman et al. | |
| 5,884,948 | A | 3/1999 | Weinerman et al. | |
| 5,918,918 | A | 7/1999 | Mosley | |
| 7,055,874 | B1 | 6/2006 | Jeffries et al. | |
| 7,137,656 | B2 | 11/2006 | Bird et al. | |
| 7,938,458 | B1 | 5/2011 | Zweibohmer et al. | |
| 8,342,582 | B2 | 1/2013 | Bendel et al. | |
| 8,348,309 | B2 | 1/2013 | Patel et al. | |
| 8,631,608 | B1 | 1/2014 | Konchan et al. | |
| 8,672,386 | B2 | 3/2014 | Yoo et al. | |
| 9,422,754 | B2 | 8/2016 | Graute et al. | |
| 10,060,166 | B2 | 8/2018 | Sayama et al. | |
| 10,280,660 | B2 | 5/2019 | Nozawa et al. | |
| 10,450,782 | B2 | 10/2019 | Nurmi et al. | |
| 10,493,871 | B2 | 12/2019 | Tone | |
| 10,676,967 | B2 | 6/2020 | Schwickerath et al. | |
| 10,697,207 | B2 | 6/2020 | Zweibohmer et al. | |
| 11,965,364 | B2 * | 4/2024 | Muller | E05B 77/38 |
| 2006/0103144 | A1 | 5/2006 | Bullock et al. | |
| 2009/0224559 | A1 | 9/2009 | Park | |
| 2011/0025078 | A1 | 2/2011 | Gentile et al. | |
| 2012/0126550 | A1 * | 5/2012 | Patel | E05B 77/38 292/195 |
| 2014/0145057 | A1 * | 5/2014 | Sayama | B60N 2/366 248/503.1 |
| 2014/0292002 | A1 * | 10/2014 | Graute | E05B 85/26 292/195 |
| 2015/0184430 | A1 * | 7/2015 | Kalsi | E05B 85/02 292/201 |
| 2015/0191945 | A1 * | 7/2015 | Yamaguchi | E05B 85/02 292/196 |
| 2016/0326780 | A1 * | 11/2016 | Watanabe | B60K 15/05 |
| 2017/0260774 | A1 * | 9/2017 | Schwickerath | E05B 63/042 |
| 2019/0390486 | A1 * | 12/2019 | Takagi | E05B 79/02 |

FOREIGN PATENT DOCUMENTS

| | | | | |
|---|---|---|---|---|
| DE | 29913464 | U1 * | 12/1999 | E05B 77/28 |
| EP | 0894923 | A1 * | 2/1999 | |
| FR | 2789718 | A1 * | 8/2000 | E05B 77/26 |
| GB | 2253435 | A * | 9/1992 | E05B 81/06 |
| JP | H07158331 | A | 6/1995 | |
| JP | 2505365 | Y2 * | 7/1996 | |
| JP | 2003214003 | A * | 7/2003 | |
| JP | 5271626 | B2 | 8/2013 | |
| KR | 20090097707 | A * | 9/2006 | |

OTHER PUBLICATIONS

Espacenet machine translation of CN 103670069 A, generated Nov. 19, 2024 (Year: 2024).*

International Search Report and Written Opinion in PCT/US2023/085045, mailed Jul. 17, 2024, 25 pages.

* cited by examiner

ROTARY LATCH WITH DAMPENING AND BARREL RETENTION

TECHNICAL FIELD

The invention relates to a mechanical rotary latch for a vehicle door, and having dampening bumper for soft opening and closing, and having a snap fit actuation barrel for releasing the rotor from the closed position to the open position.

BACKGROUND

Conventional mechanical door latches have a rotor and a catch reciprocally, rotatably mounted with spring bias on axles between opposing latch plates. The latch assembly is mounted on door frame of a vehicle. The rotor is adapted to capture a striker mounted on the door to retain the door in a closed position. The catch holds the rotor in the closed position. One or more trip levers are operatively connected to the catch, to rotate the catch and thereby release the rotor from the closed position to an open position, and thereby release the striker so the door can be opened. The latch assembly may include a soft rubber or elastomeric bumper or stop which is engaged by the rotor during closing, thereby isolating and dampening noise during closing. During opening, conventional latch assemblies allow the rotor to contact a latch plate to stop rotation, thereby creating an annoying clicking noise upon opening. Also, the captured striker sometimes rattles against the rotor during vehicle travel, thereby creating an undesirable noise.

Another problem with prior art door latches arises during assembly of the components. More particularly, the actuator barrel, which is connected to one of the trip levers and controls movement of the catch, is mounted using a C-clip for retention to the latch plates. However, this retaining clip is small, and can be missed or forgotten during assembly and possibly fall-out in operation, so that the barrel is not securely retained. The clip also adds cost to the latch.

Accordingly, a primary objective of the present invention is the provision of a quieter door latch having noise dampening in both fully open and closed positions.

Another objective of the present invention is the provision of a door latch having a resilient bumper to dampen noise from the rotor as the rotor rotates between open and closed positions.

A further objective of the present invention is the provision of a door latch having an actuator barrel which is snap fit to one of the latch plates, to simplify the assembly process and to reduce cost of the latch.

Still another objective of the present invention is the provision of a door latch assembly having a barrel actuator for the catch which is mounted without use of a retaining clip.

These and other objectives will become apparent from the following description of the invention and drawings.

SUMMARY

The latch assembly of the present invention includes front and back plates fastened by a pair of axles. A rotor is pivotally mounted on one axle and a catch is pivotally mounted on the other axle. The rotor is adapted to capture and release a striker on a vehicle door to secure the door when closed and to allow the door to open. A resilient bumper is sandwiched between the plates to engage the rotor upon movement to both the open and closed positions, thereby providing a "soft" opening and closing, which substantially minimizes noise from the rotor movement. The bumper also engages the striker when the rotor is closed to eliminate rattling noise that can be caused by vibration between the striker and the rotor.

A barrel actuator is mounted on one plate using a snap fit, and extends into the other plate with a rotational stop. A trip lever is attached to the barrel actuator to rotate the actuator, which in turn pivots the catch to release the rotor from the closed position to a spring-biased open position.

DETAILED DESCRIPTION

Figure 1:
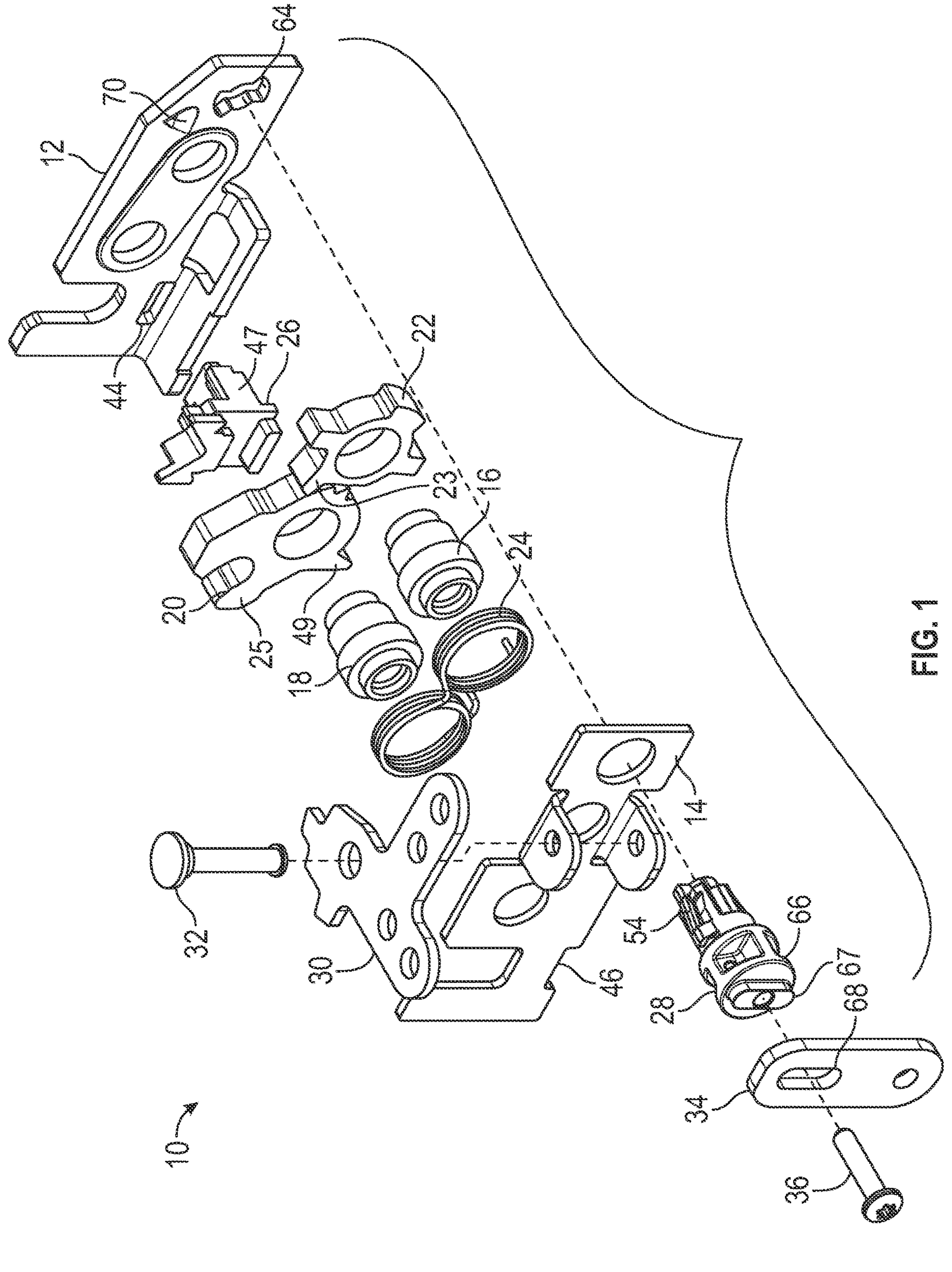
FIG. 1 is an exploded perspective view of the latch assembly.
Figure 2:
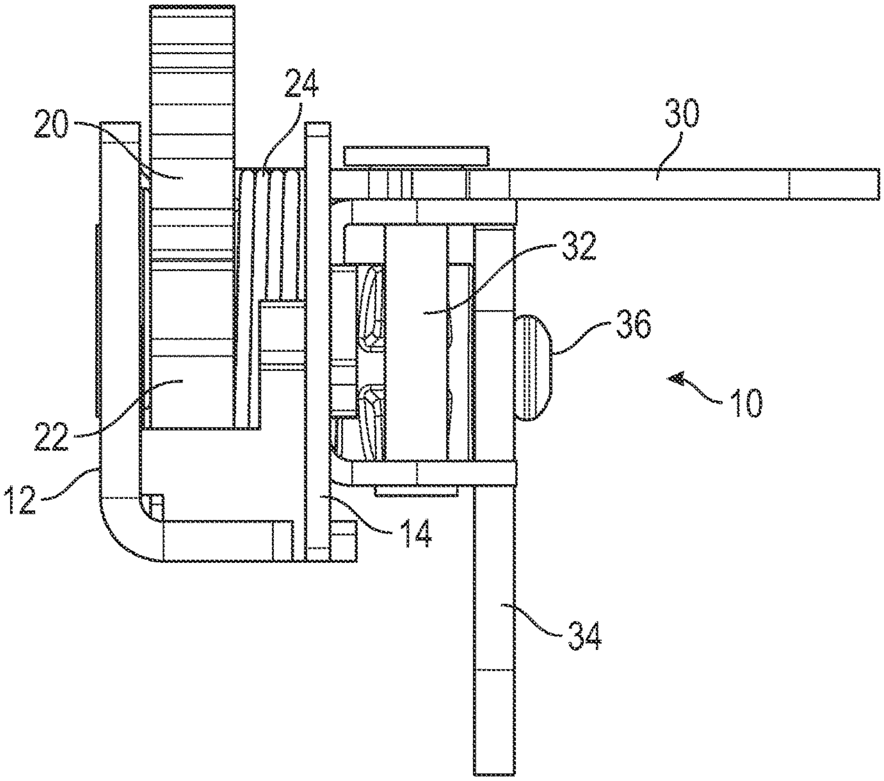
FIG. 2 is a right side view of the latch assembly with all parts shown and the rotor fully open.
Figure 3:
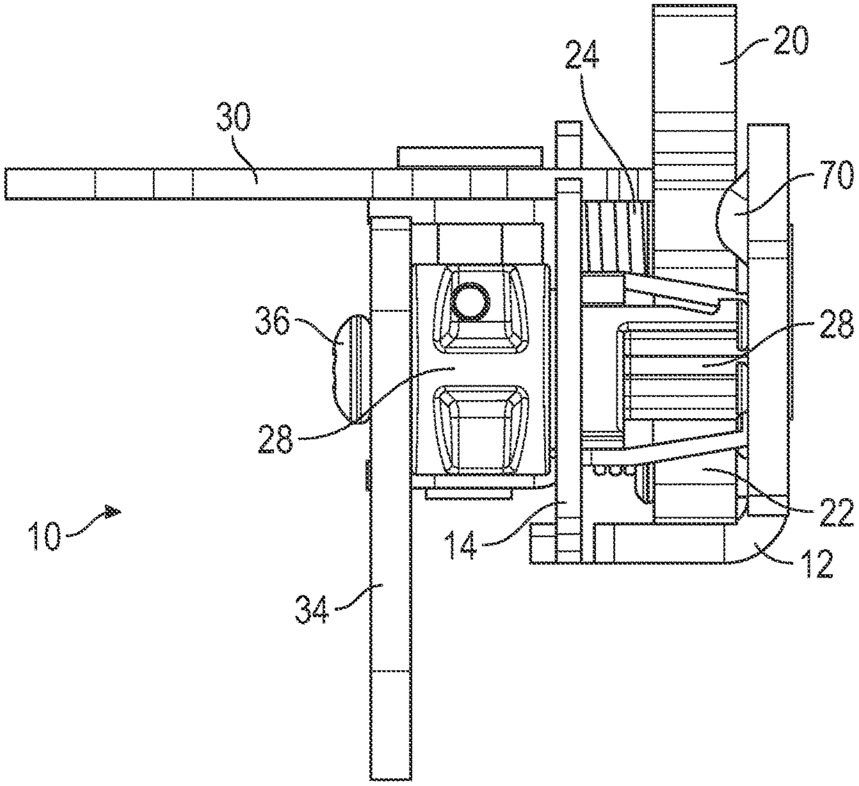
FIG. 3 is a s left side view of the latch system mechanism with all parts shown and the rotor fully open.
Figure 4:
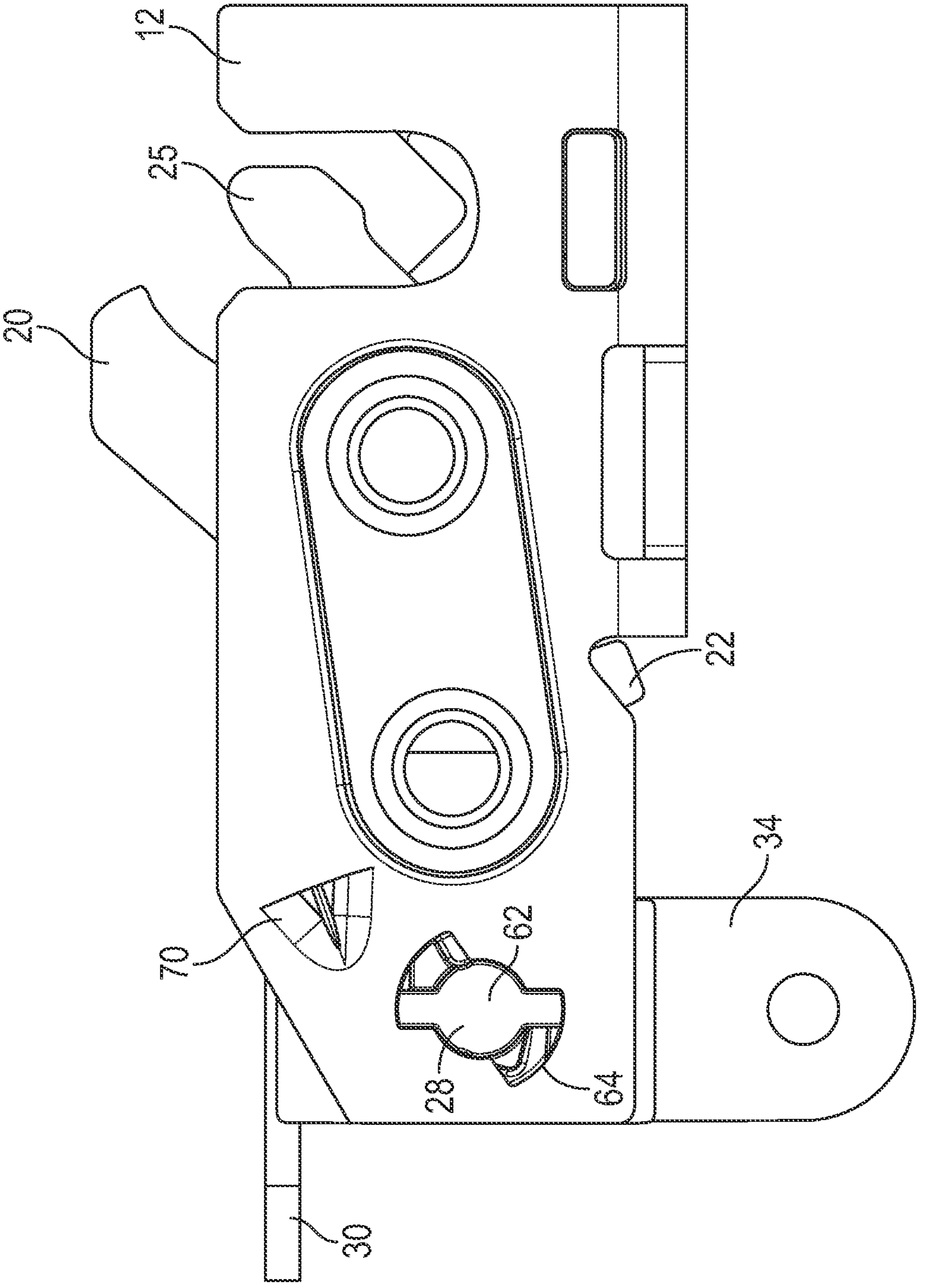
FIG. 4 is a front view of the latch assembly with all parts shown and the rotor fully open.
Figure 5:
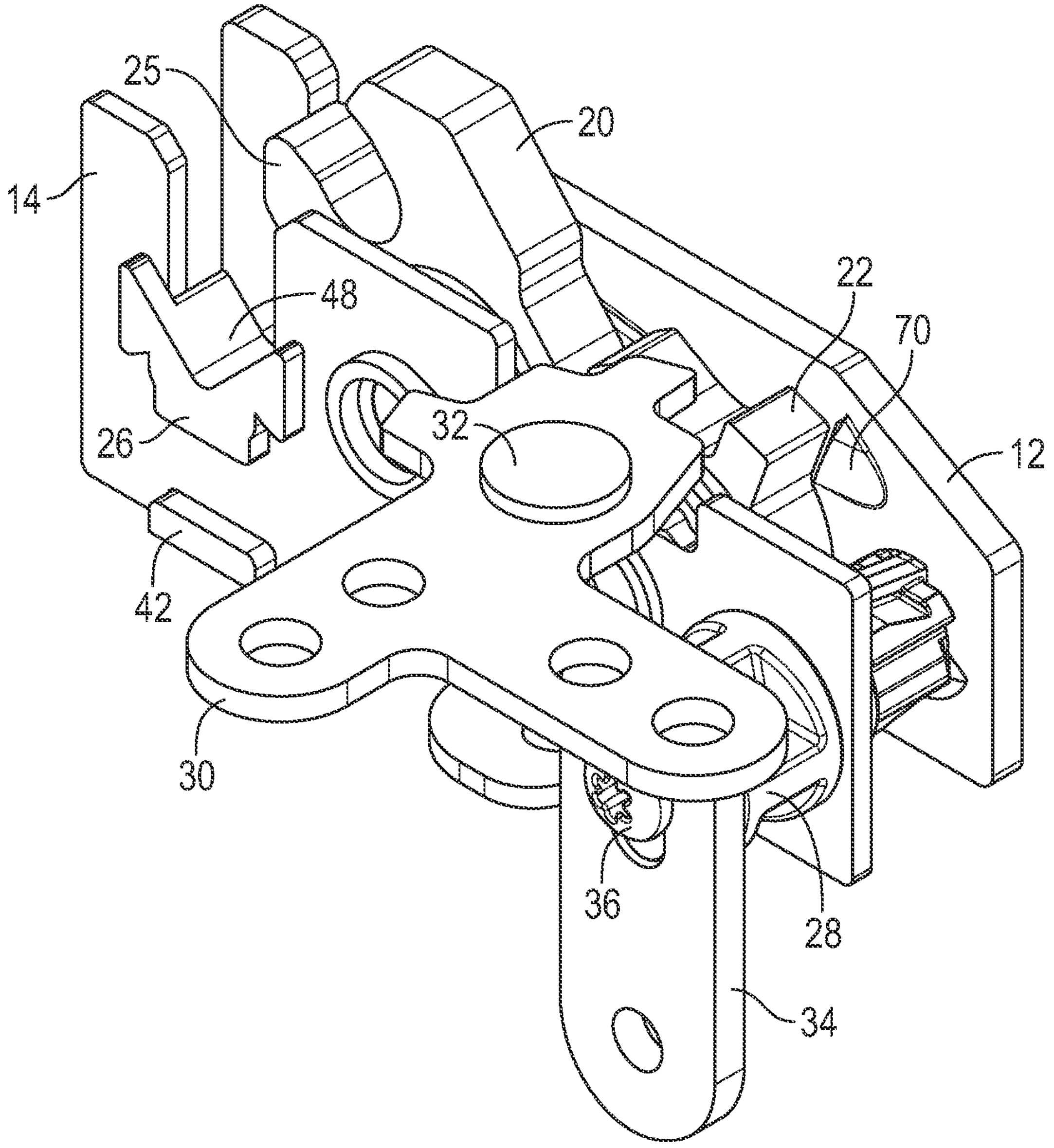
FIG. 5 is a perspective view of the latch assembly with all parts shown and the rotor fully open
Figure 6:
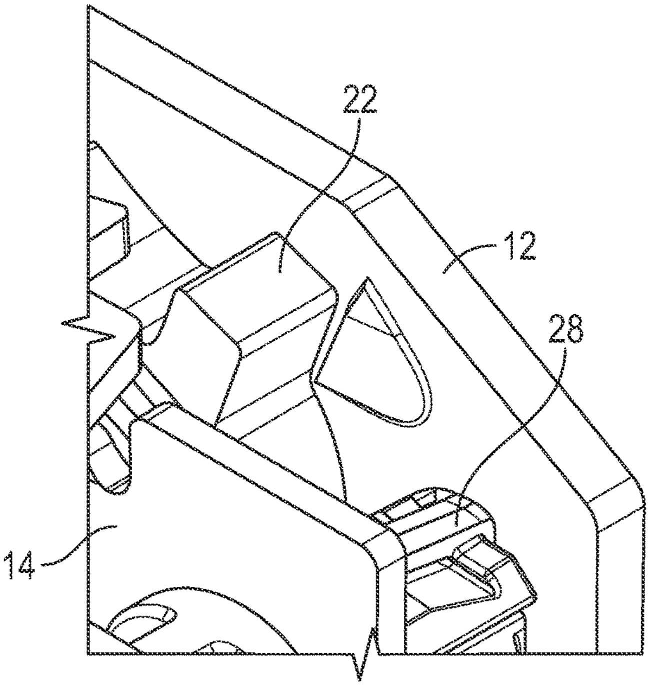
FIG. 6 is a perspective view of the latch assembly, showing the catch rotated to the released position.
Figure 7:
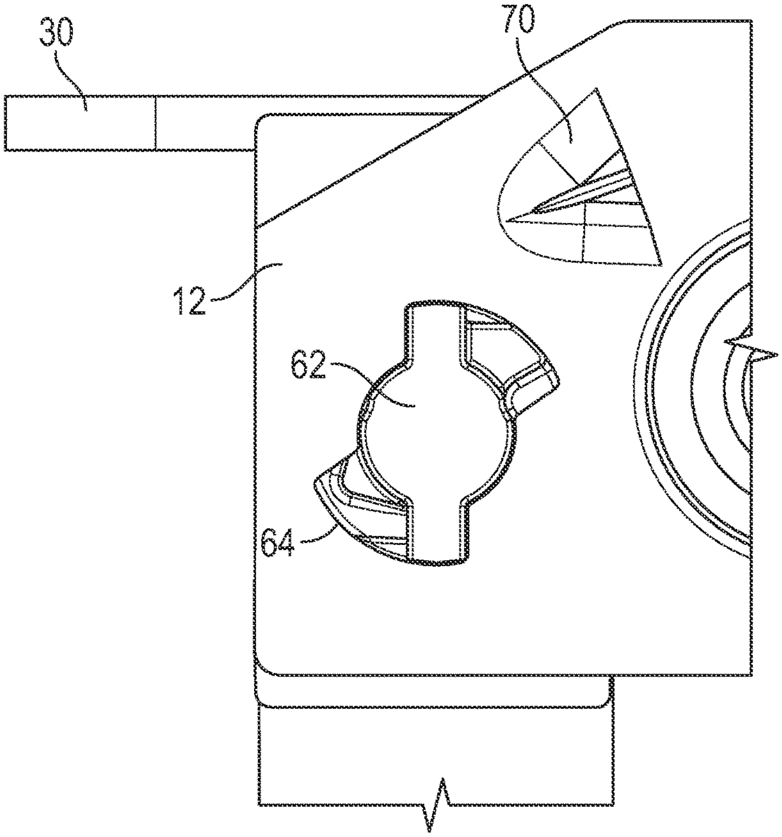
FIG. 7 is a partial front view of the latch showing the barrel in its normal at-rest state.
Figure 8:
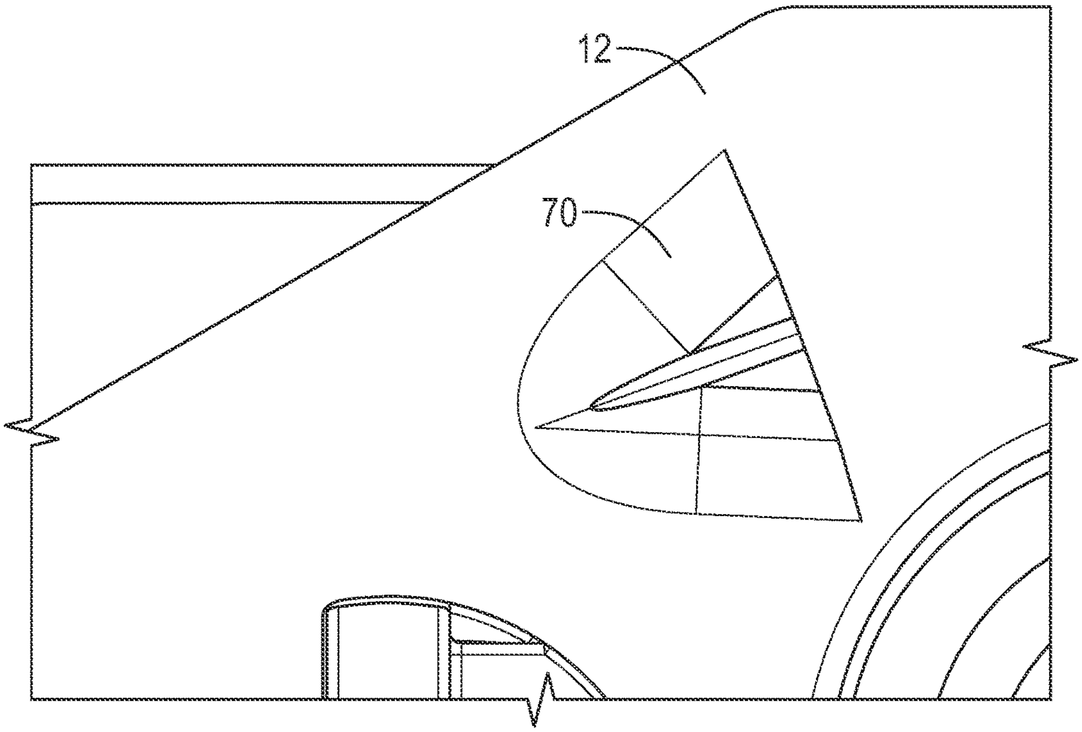
FIG. 8 is a close-up partial perspective view of the stopping mechanism for the catch.
Figure 9:
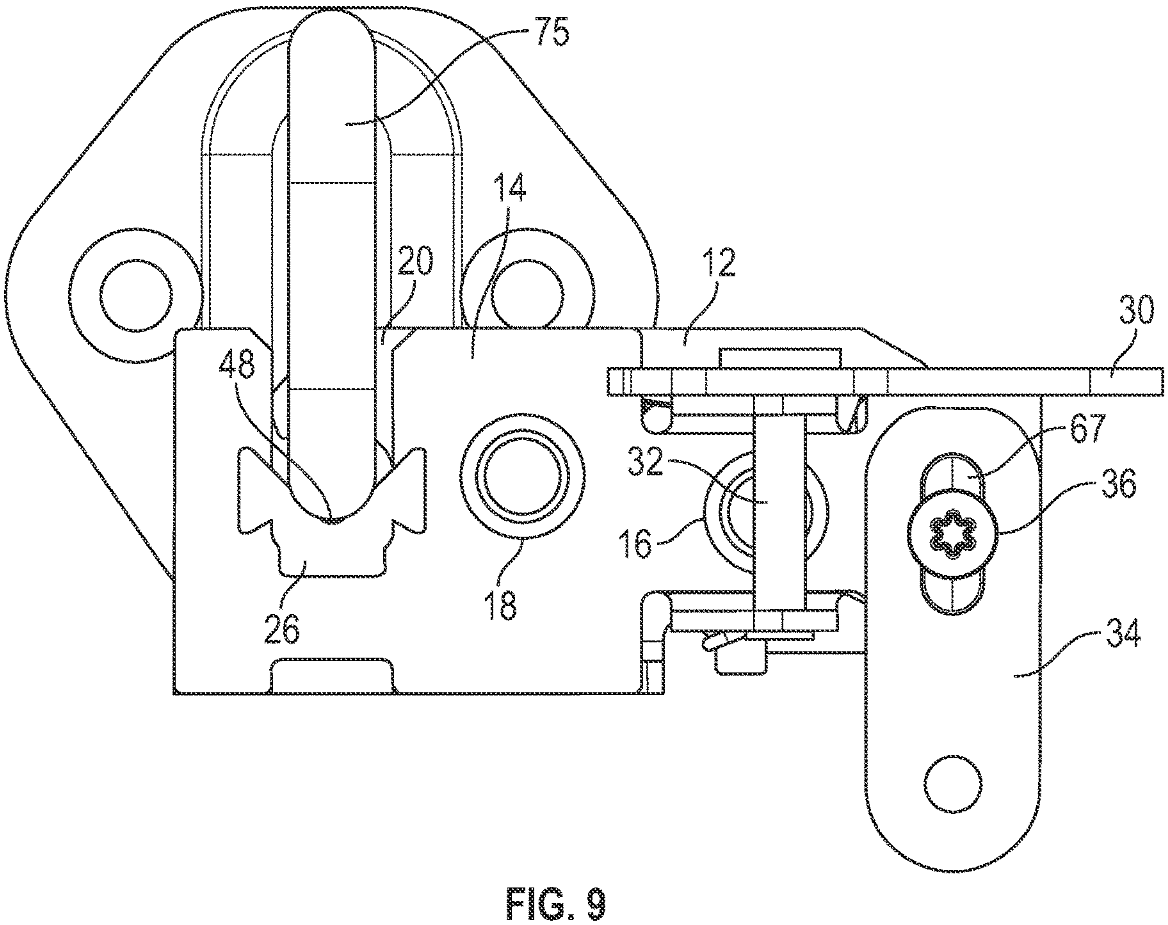
FIG. 9 is a back view of the entire latch assembly and striker, with the rotor in the fully closed position.
Figure 10:
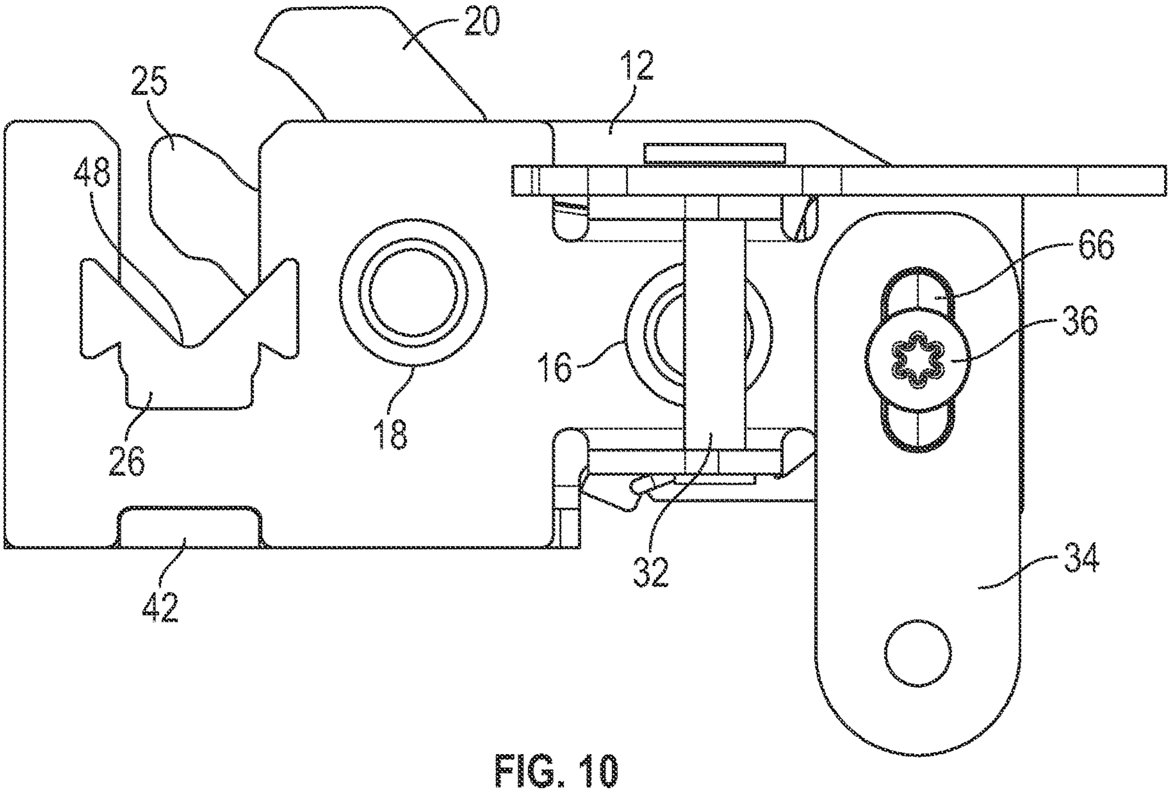
FIG. 10 is a back view of the entire latch assembly, with the rotor in the fully open position.
Figure 11:
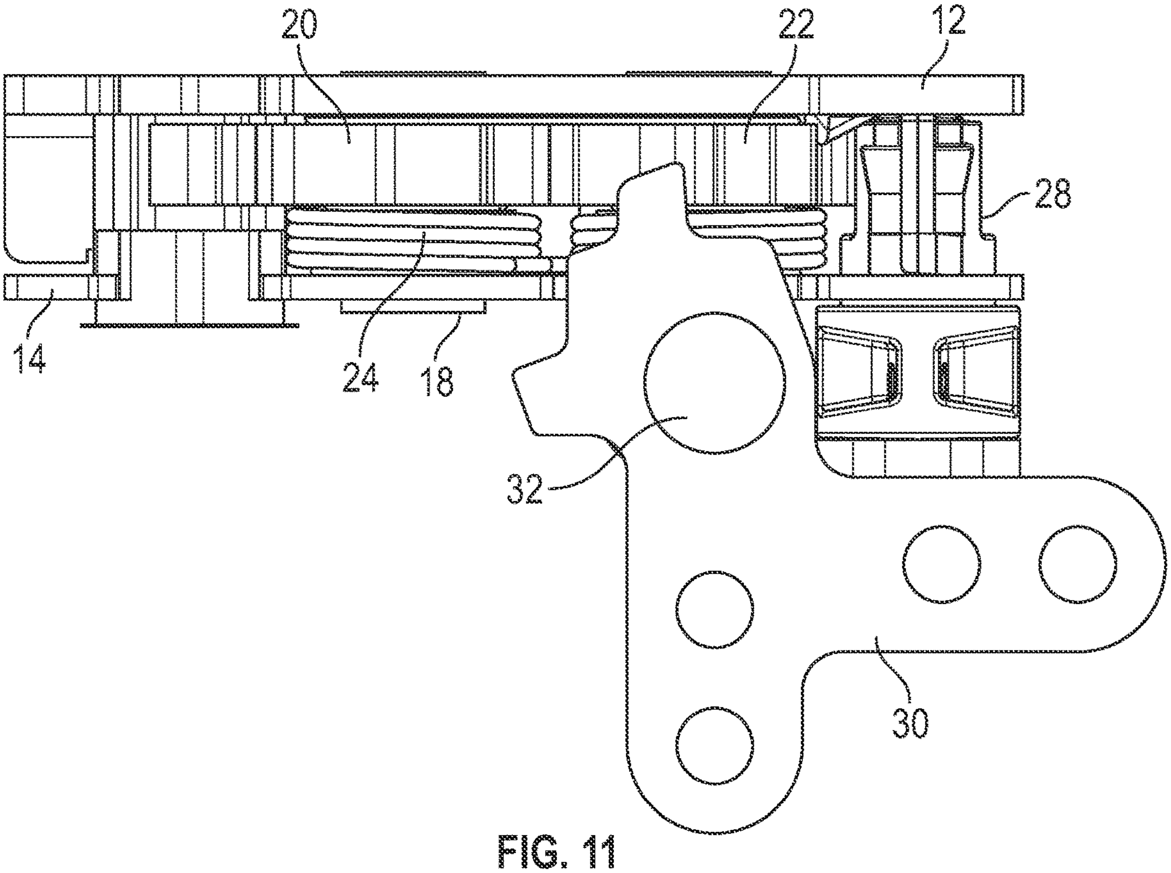
FIG. 11 is a top view of the entire latch assembly.
Figure 12:
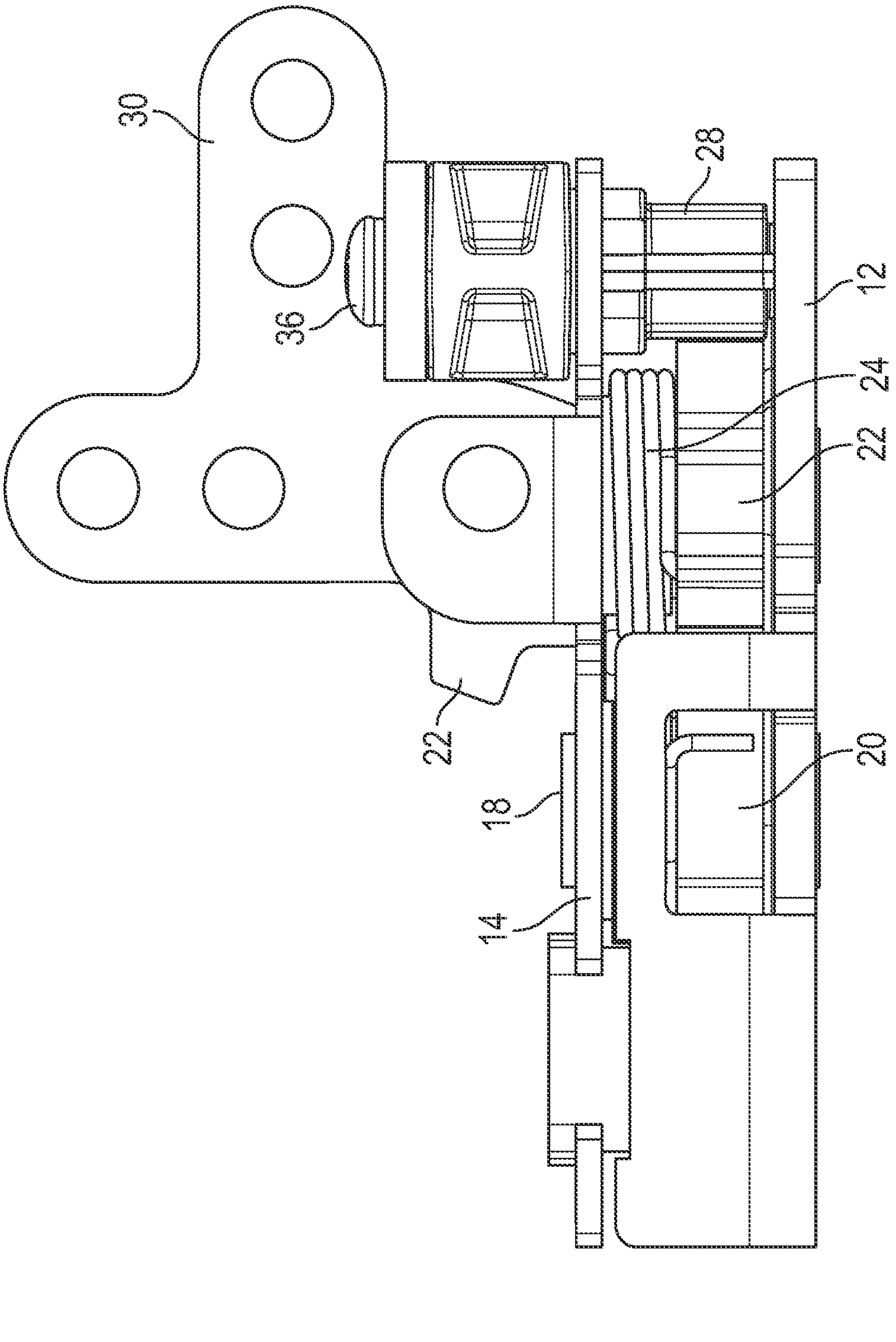
FIG. 12 is a bottom view of the entire latch assembly.
Figure 13A:
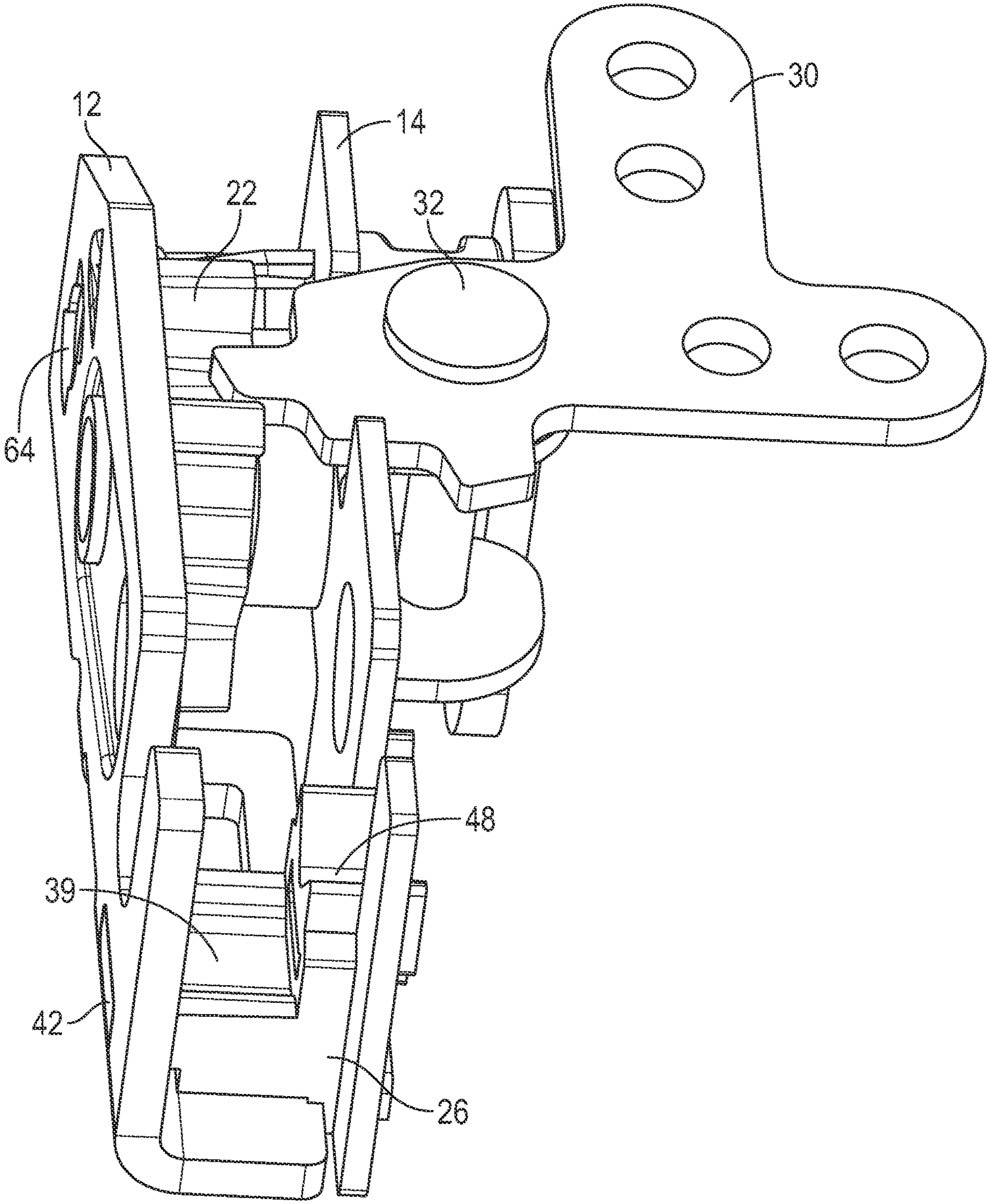
FIG. 13*a* is a perspective view with the rotor, axle, and spring hidden to show how the bumper is secured between the plates.
Figure 13B:
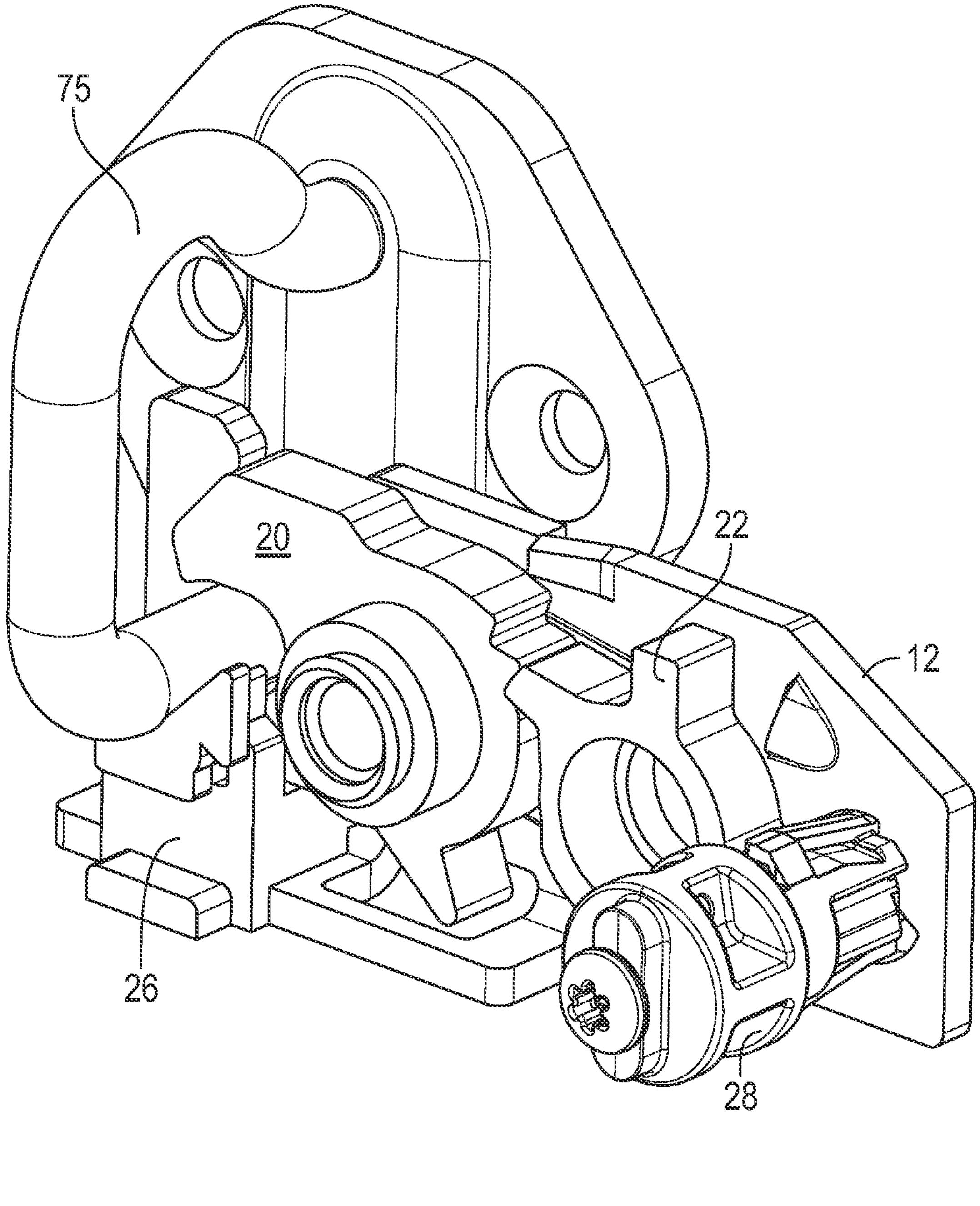
FIG. 13*b* is a perspective view with the back plate, axle, and spring hidden to show how the bumper is secured between the plates and how the striker interacts with the bumper.
Figure 14:
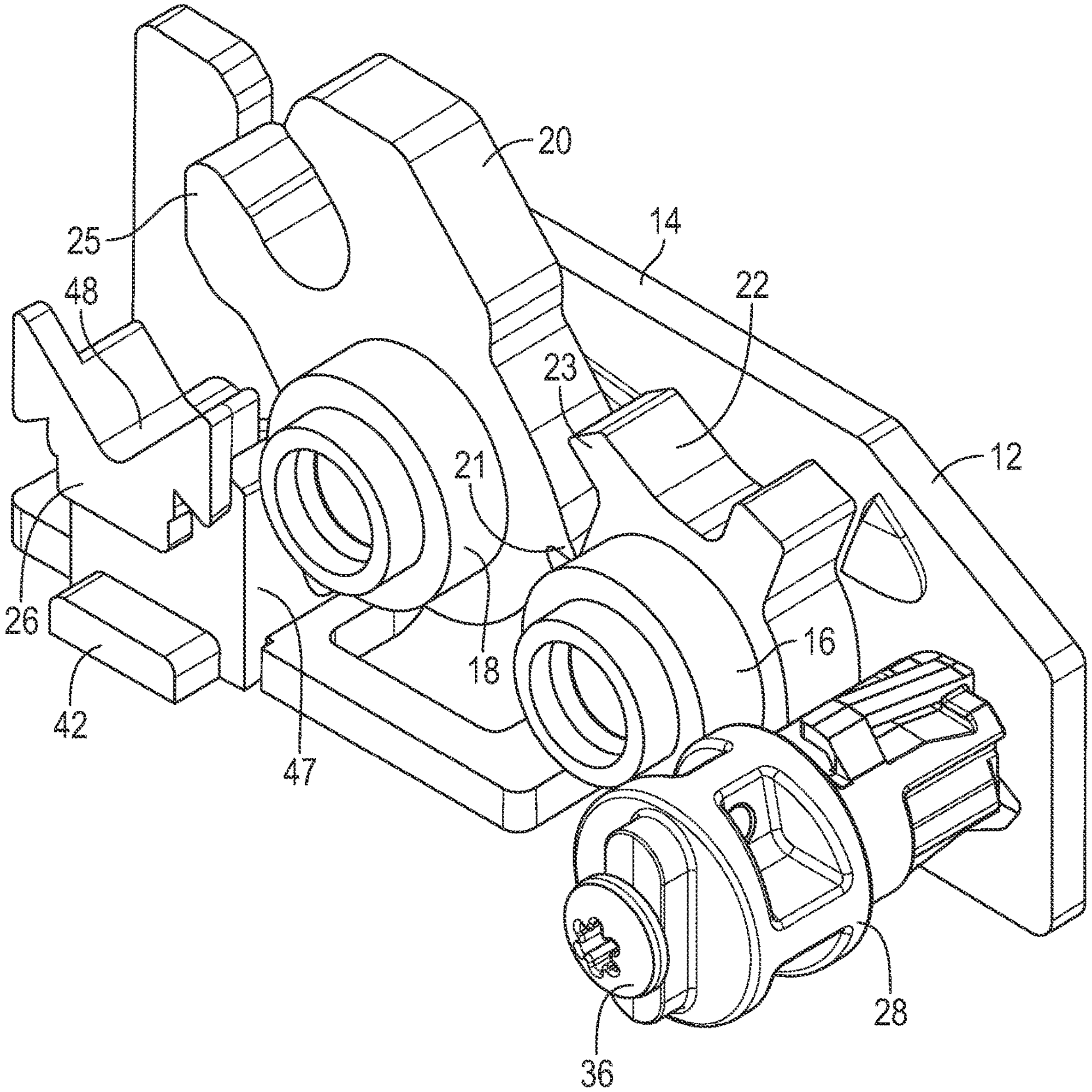
FIG. 14 is a perspective view of the latch assembly with the rotor fully open and the spring, back plate, rivet, and both levers hidden to show how the assembly works internally.
Figure 15:
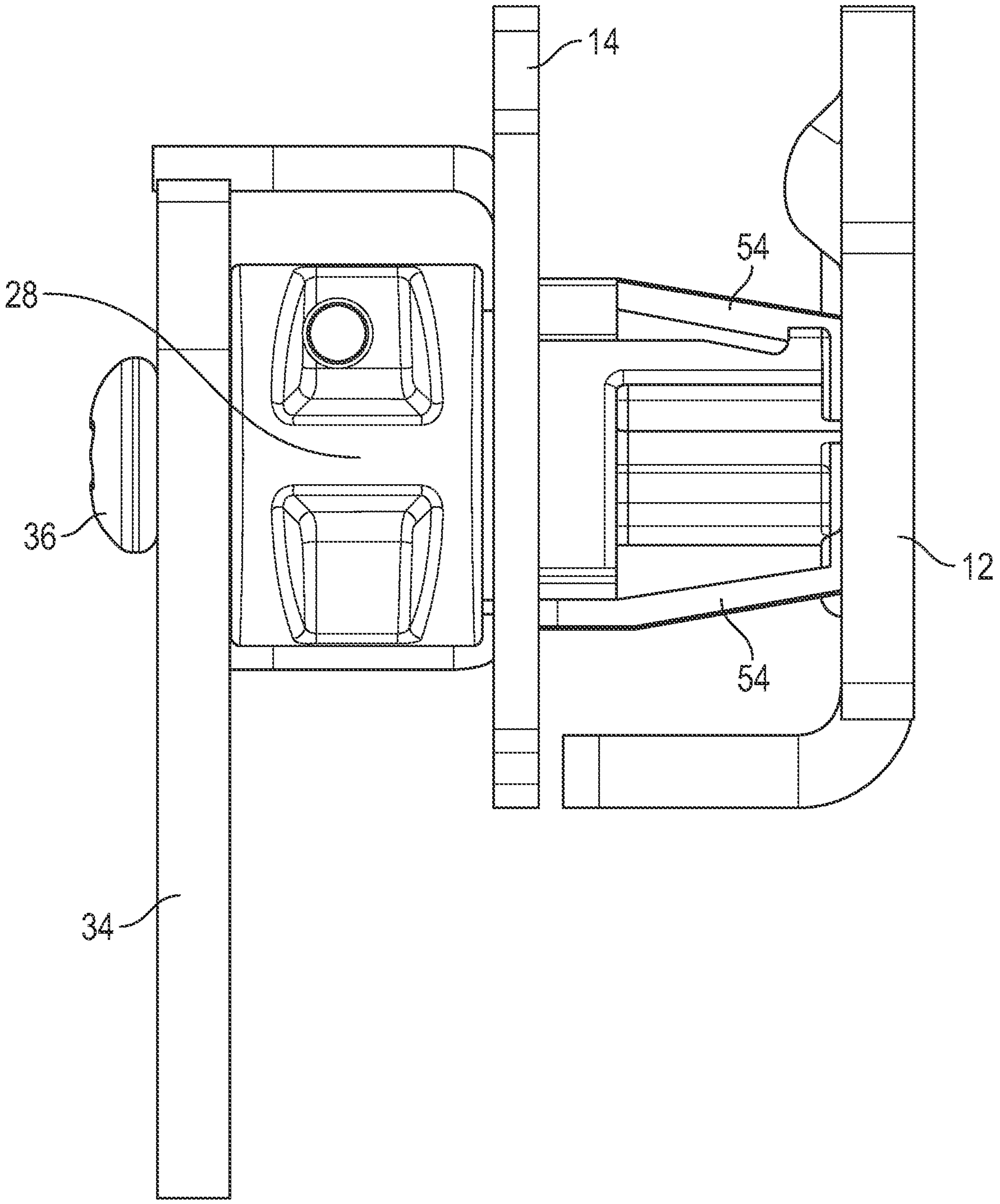
FIG. 15 is a left-side view showing only the two plates, screw, lever, and barrel to show how the barrel fits between the plates with a snap feature.
Figure 16:
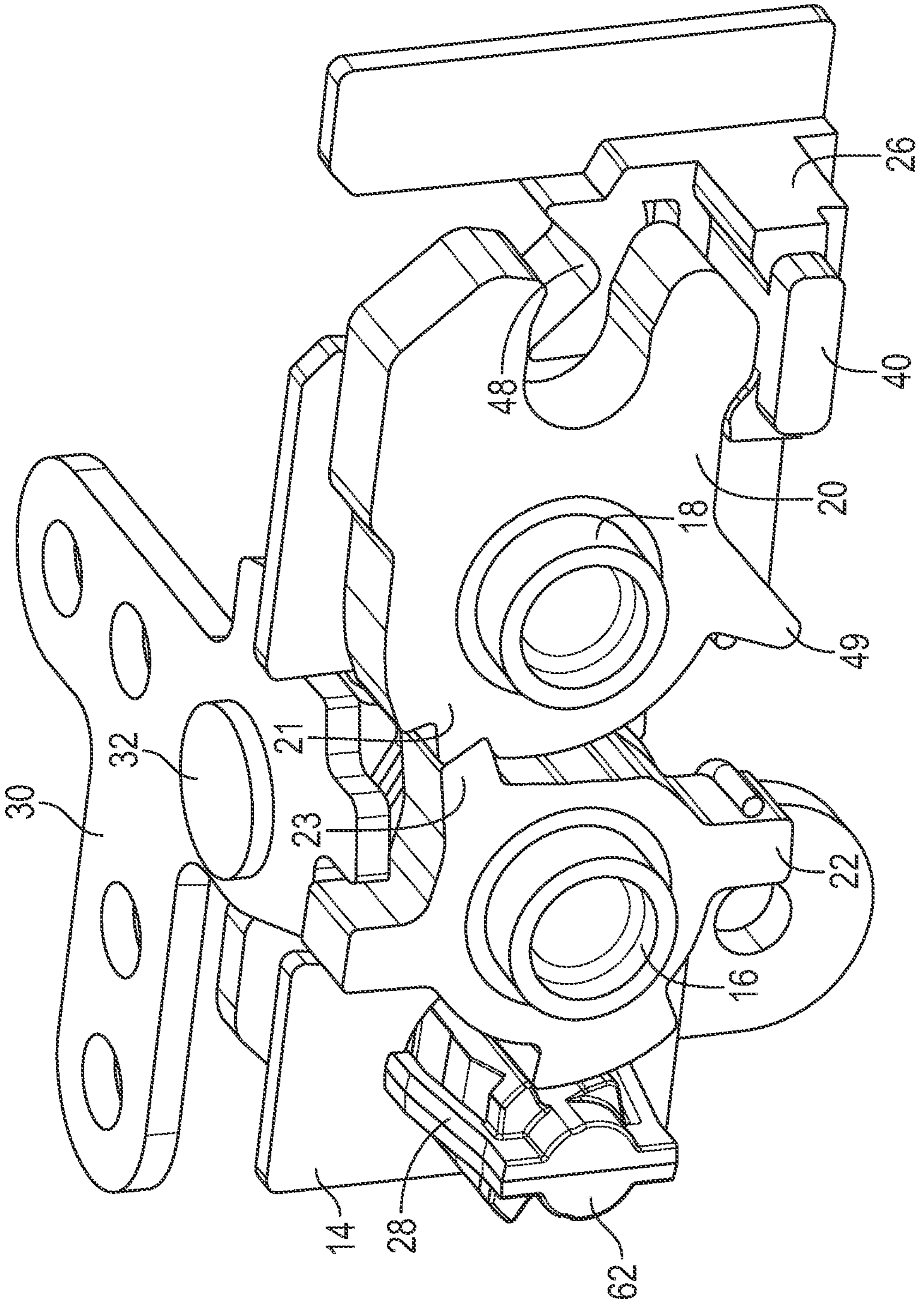
FIG. 16 is a perspective view with the back plate, with the spring hidden to better show how the rotor, in the closed position, interacts with the bumper and catch.
Figure 17:
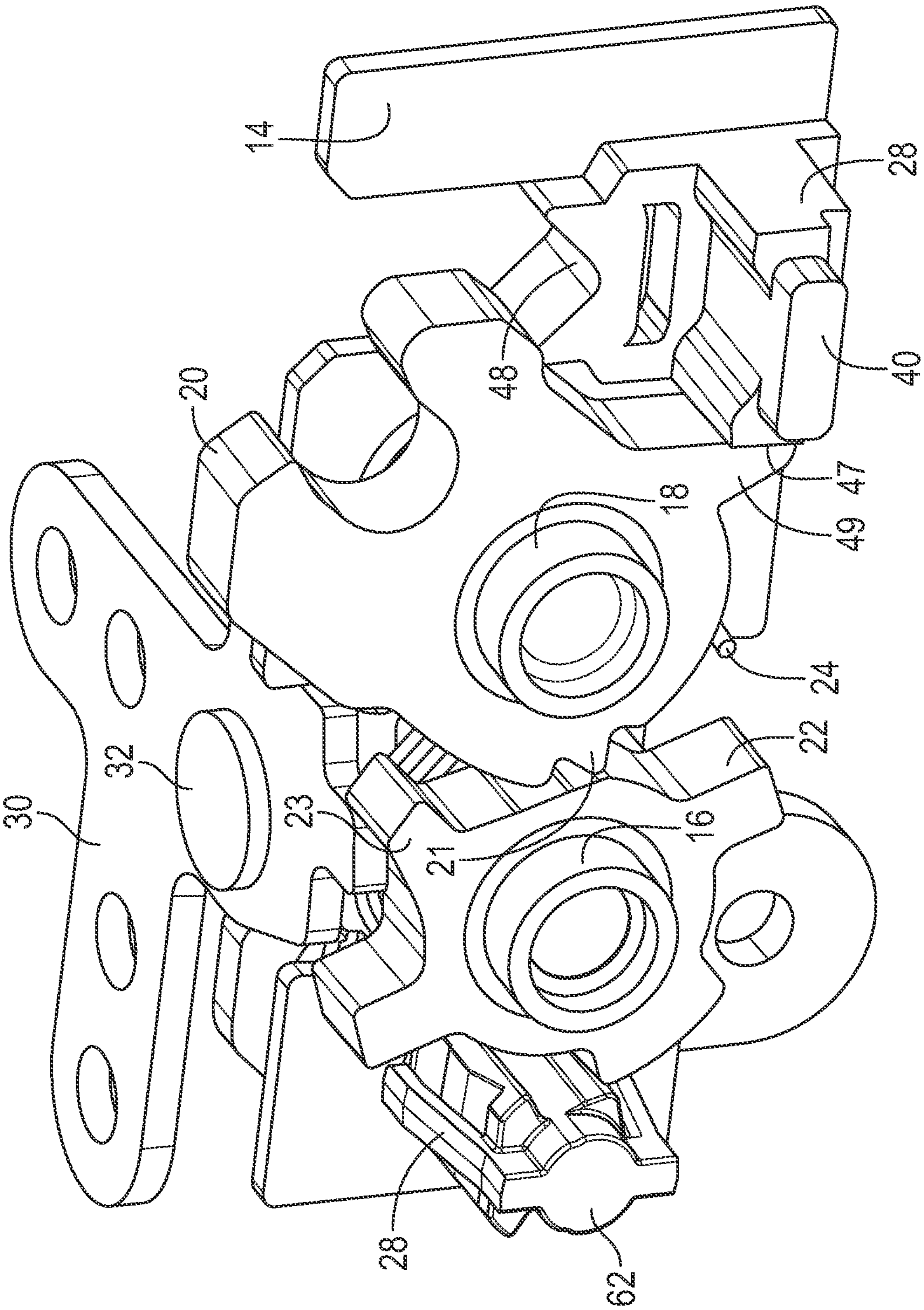
FIG. 17 is a perspective view with the back plate, with the spring hidden to better show how the rotor, in the open position, interacts with the bumper and catch.
Figure 18:
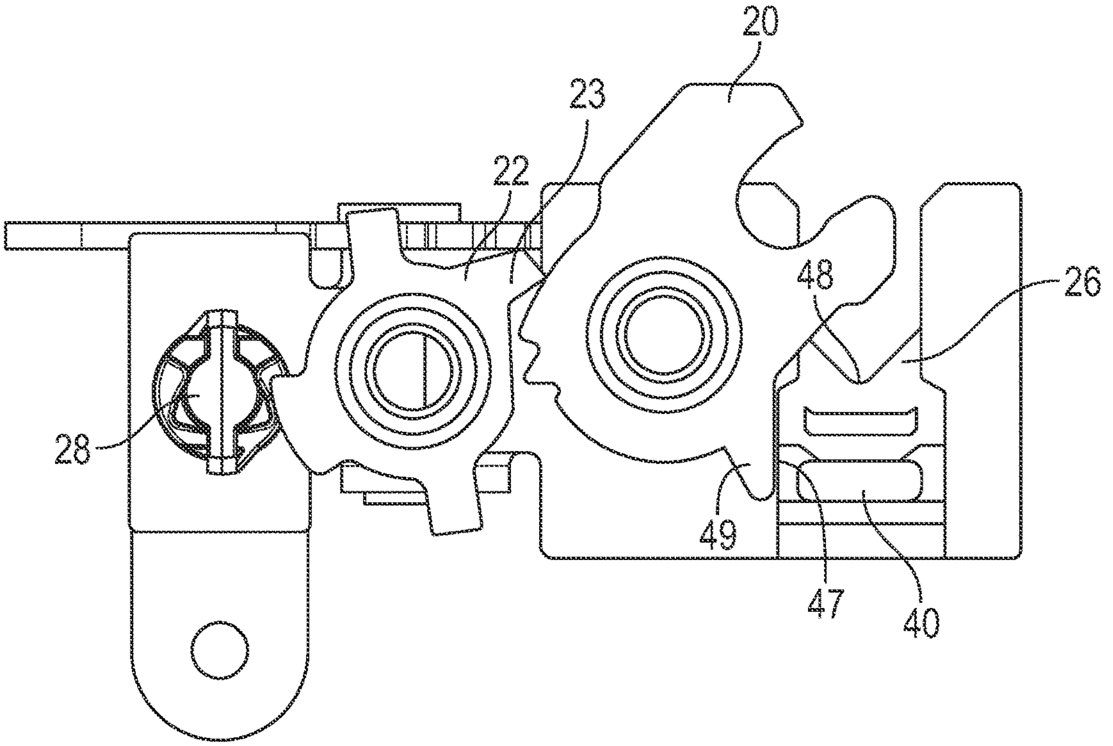
FIG. 18 is a front view of the latch assembly with the front plate and spring hidden and the rotor fully open and the lever in its resting state.
Figure 19:
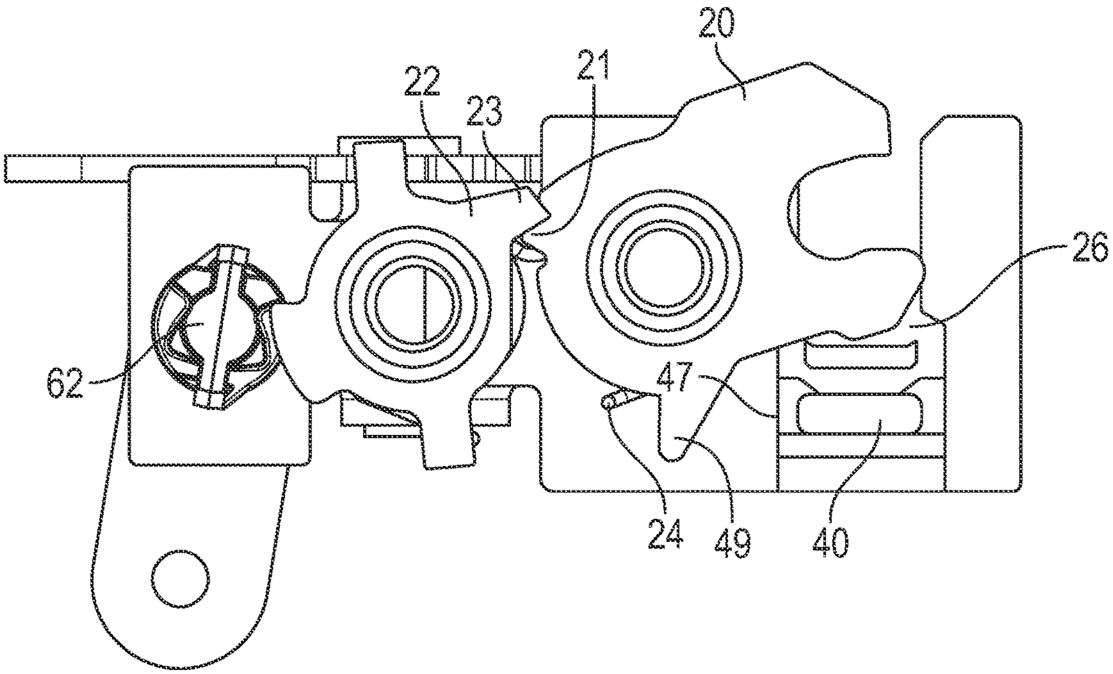
FIG. 19 is a front view of the latch assembly, with the front plate hidden and the rotor, catch, and barrel in a partially closed secondary position.
Figure 20:
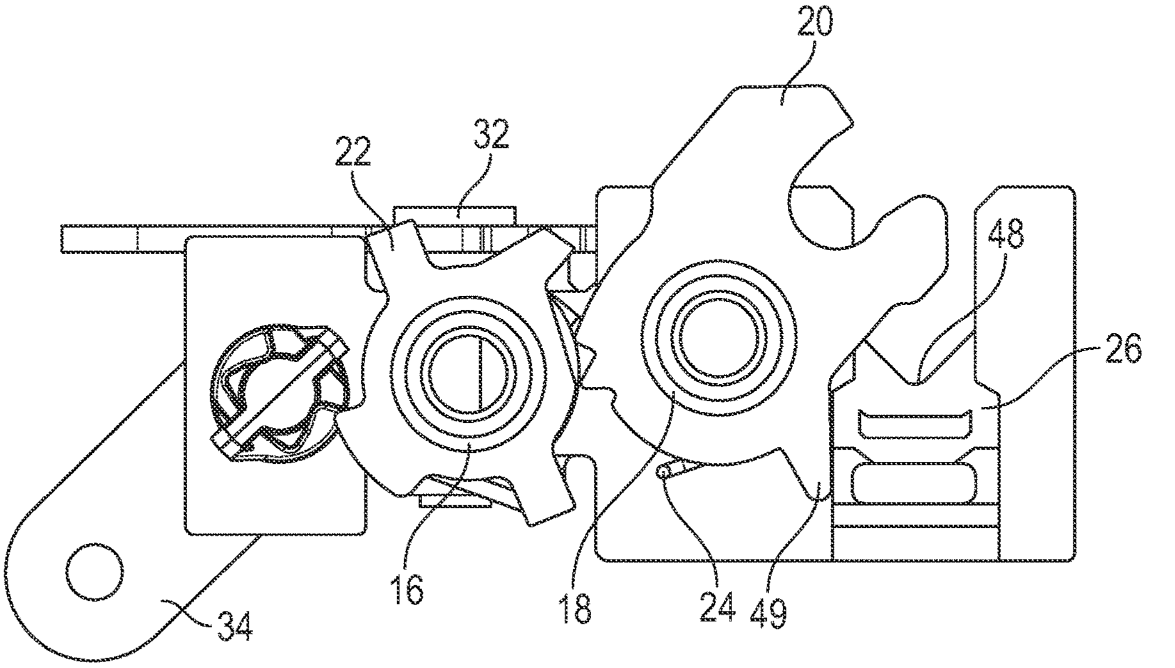
FIG. 20 is a front view of the latch assembly with the front plate hidden and the rotor fully open and the lever pulled to its furthest constraint.
Figure 21:
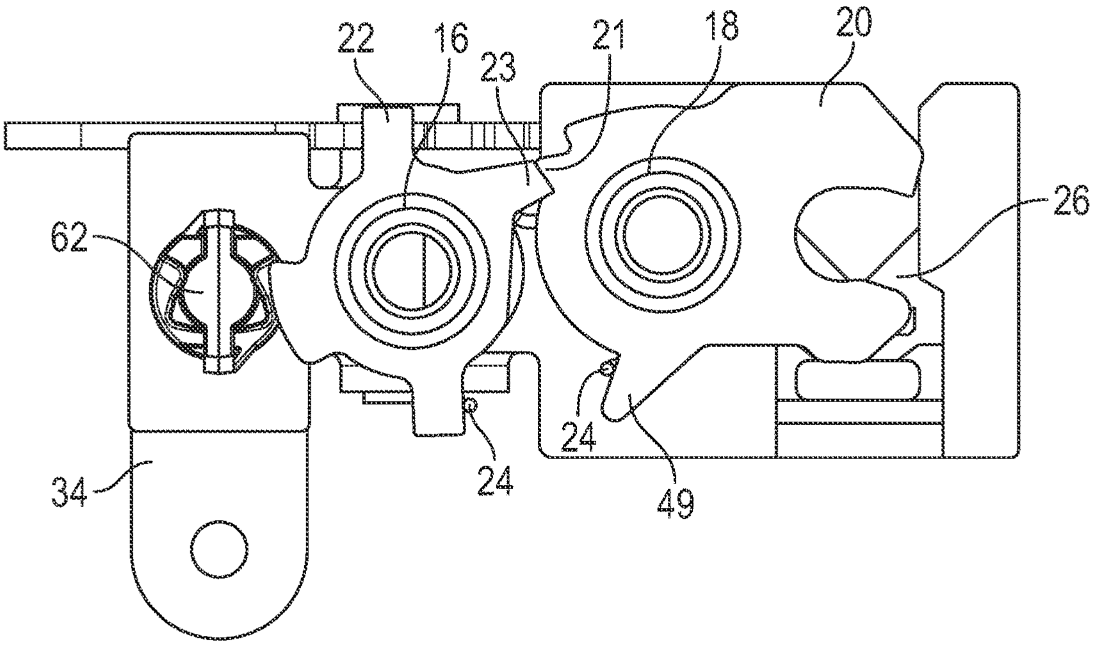
FIG. 21 is a front view of the latch assembly with the front plate hidden and the rotor fully closed with the lever in its resting state.
Figure 22:
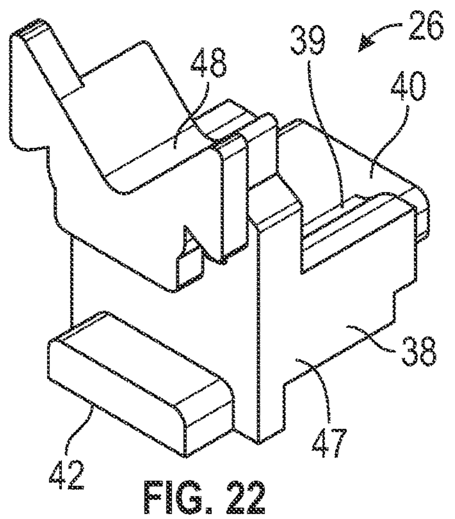
FIG. 22 is a perspective view of the bumper.
Figure 23A:
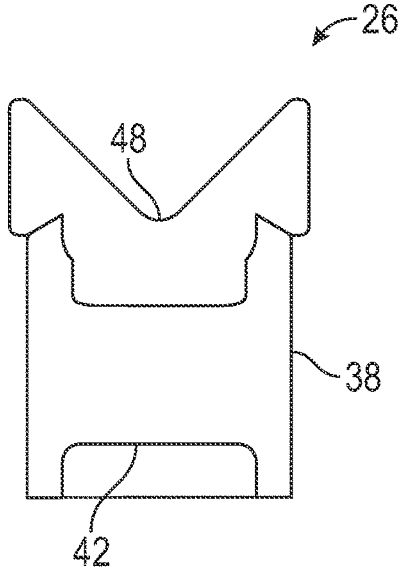
FIG. 23*a* is a back view of the bumper, with the top of the bumper shaped to catch the curvature of the rotor when the rotor is in the closed position.
Figure 23B:
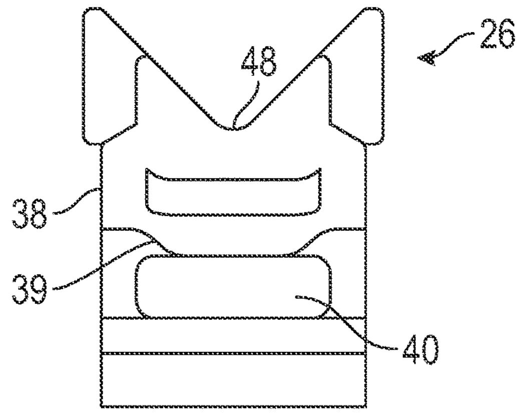
FIG. 23*b* is a front view of the bumper
Figure 24:
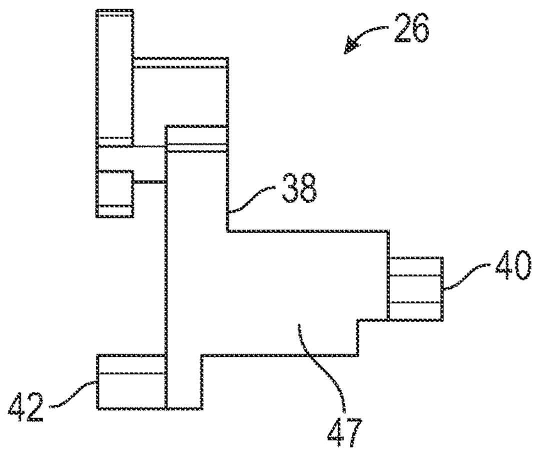
FIG. 24 is a right side view of the bumper.
Figure 25:
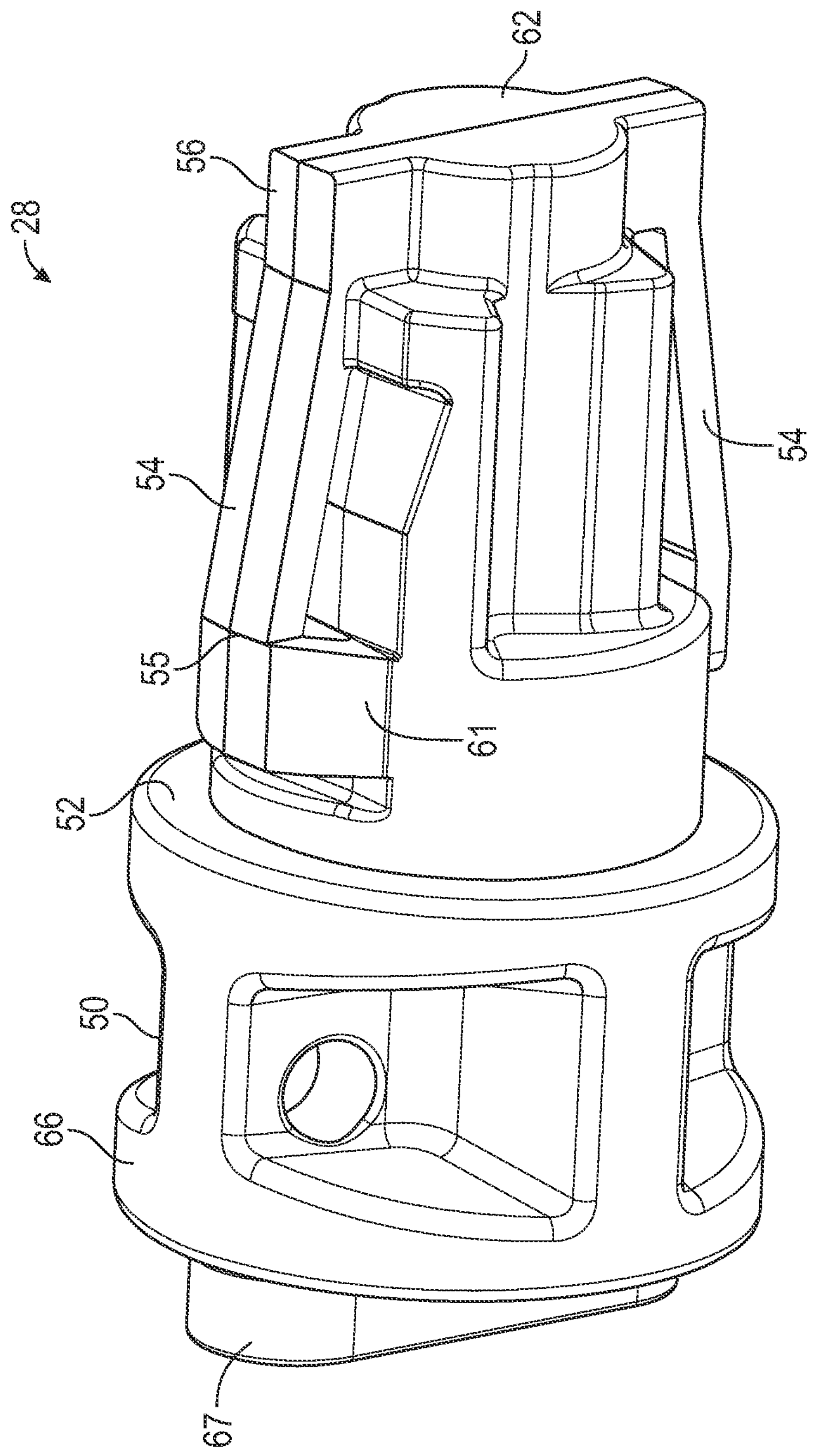
FIG. 25 is a perspective view of the barrel, showing the notches that work with the catch.
Figure 26:
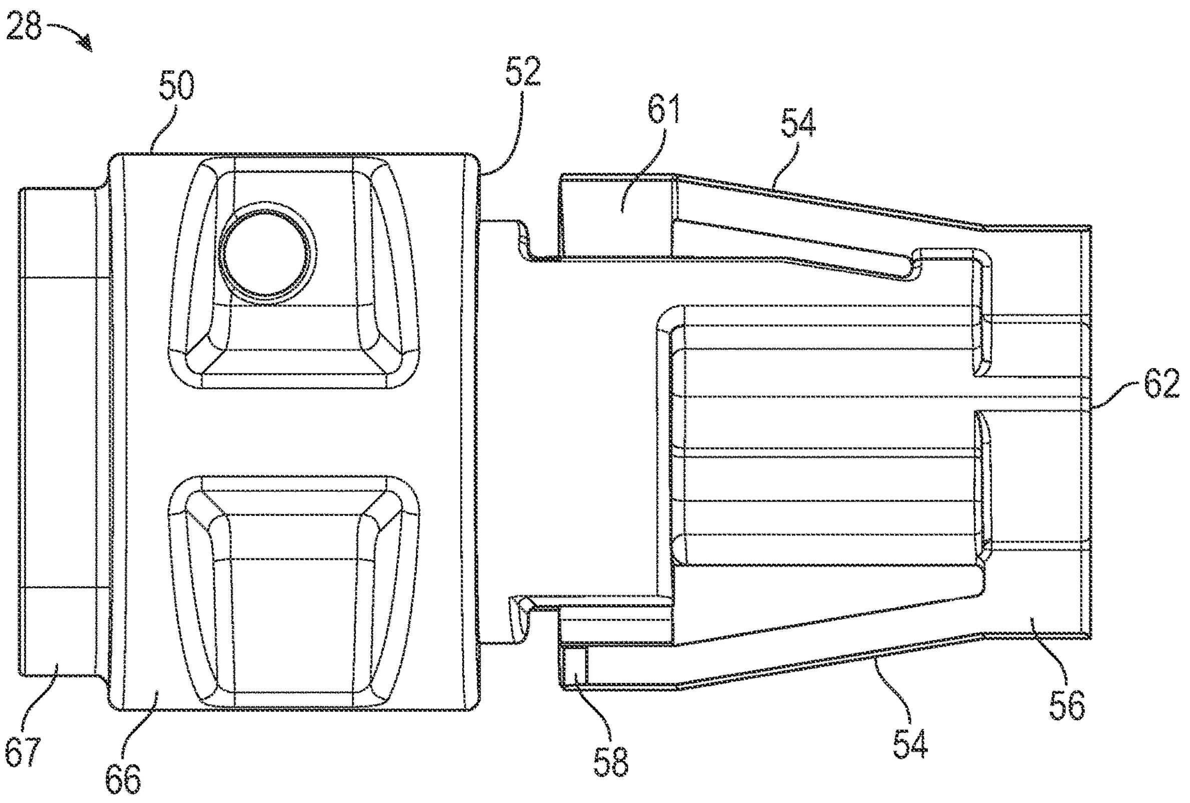
FIG. 26 is a left-side view of the barrel, showing the snap fit feature.
Figure 27:
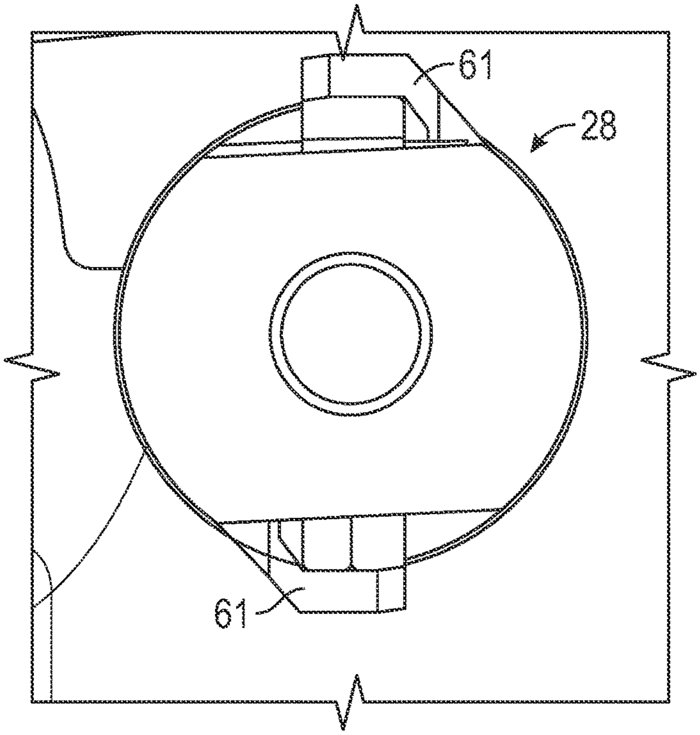
FIG. 27 is a partial back view of the barrel and a section in the front plate, to show the snap feature on the barrel.
Figure 28:
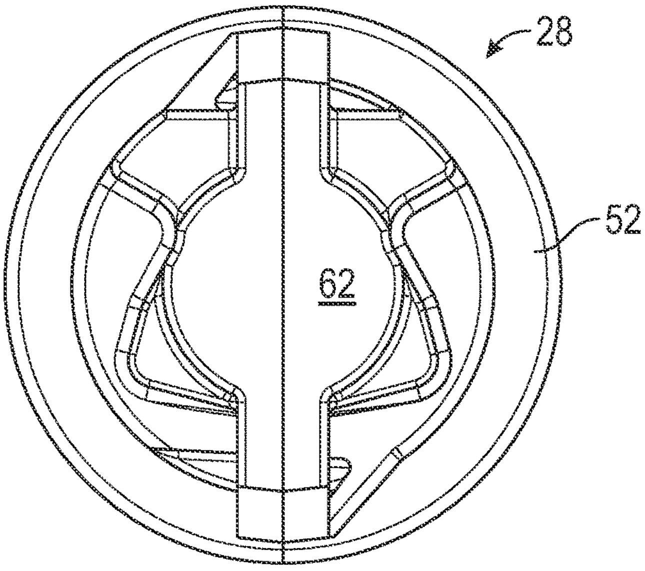
FIG. 28 is a front view of just the barrel, this view shows the torsional brace.
Figure 29:
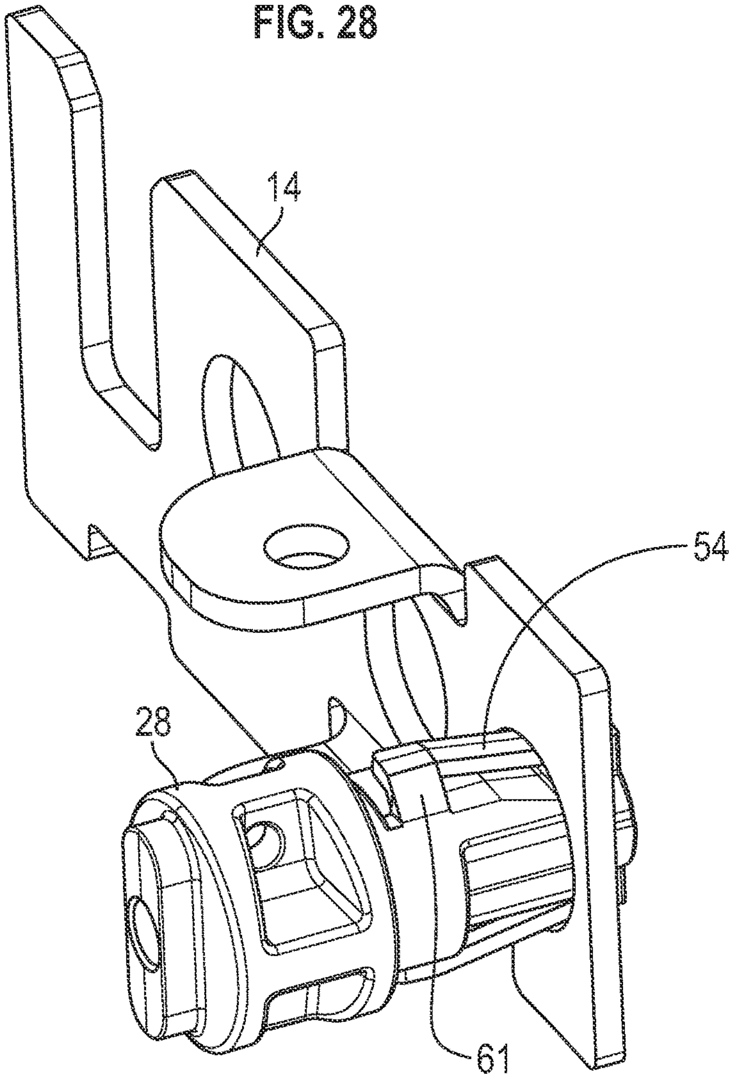
FIG. 29 is a perspective view of the barrel being inserted into the back plate with the barrel snap features slightly compressed.
Figure 30:
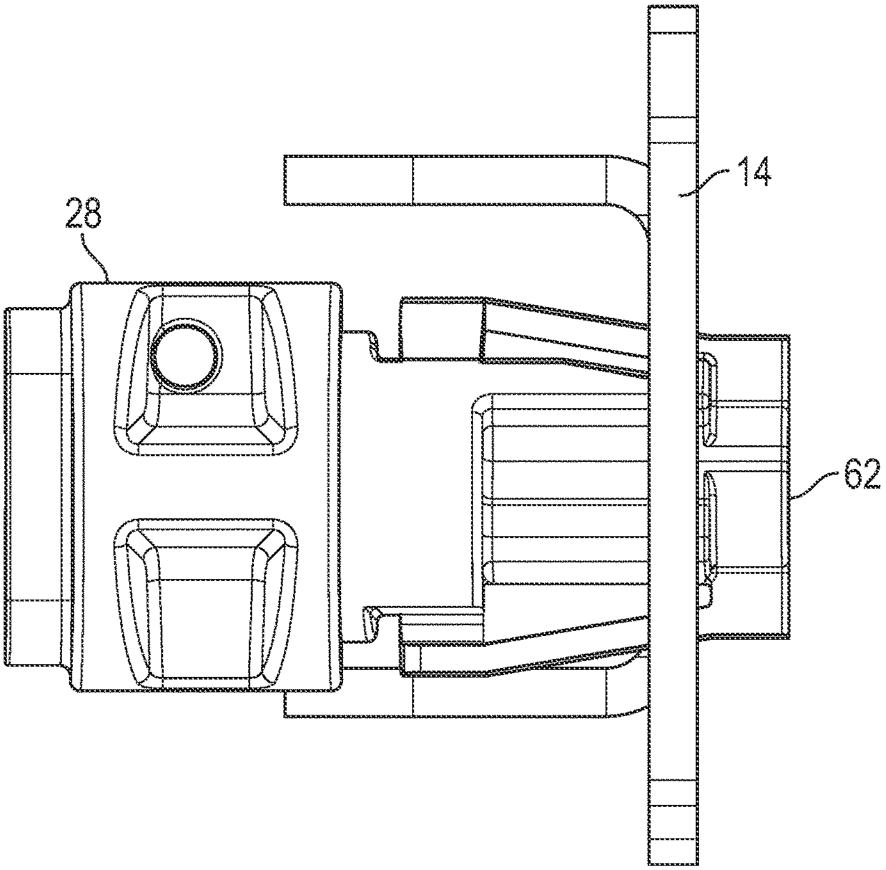
FIG. 30 is a left-side view of the barrel being inserted into the back plate with the barrel snap features extended.
Figure 31:
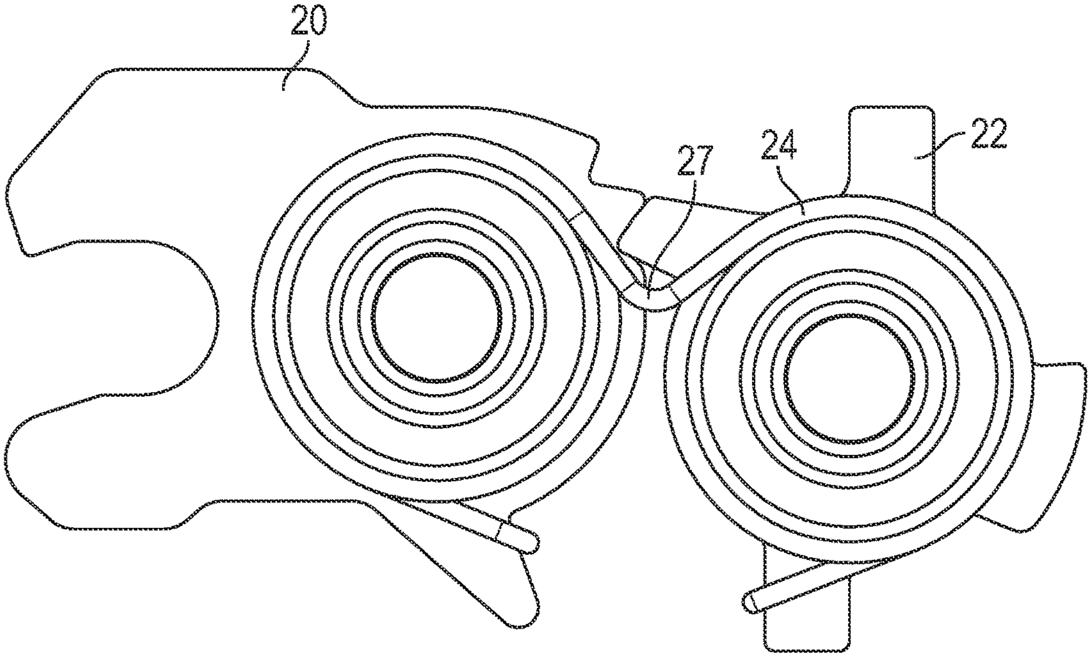
FIG. 31 is a back view of the dual torsion spring showing the 90° angle on the connecting leg which enables a higher spring force due to the restriction of rotation to the opposing coiling.
Figure 32:
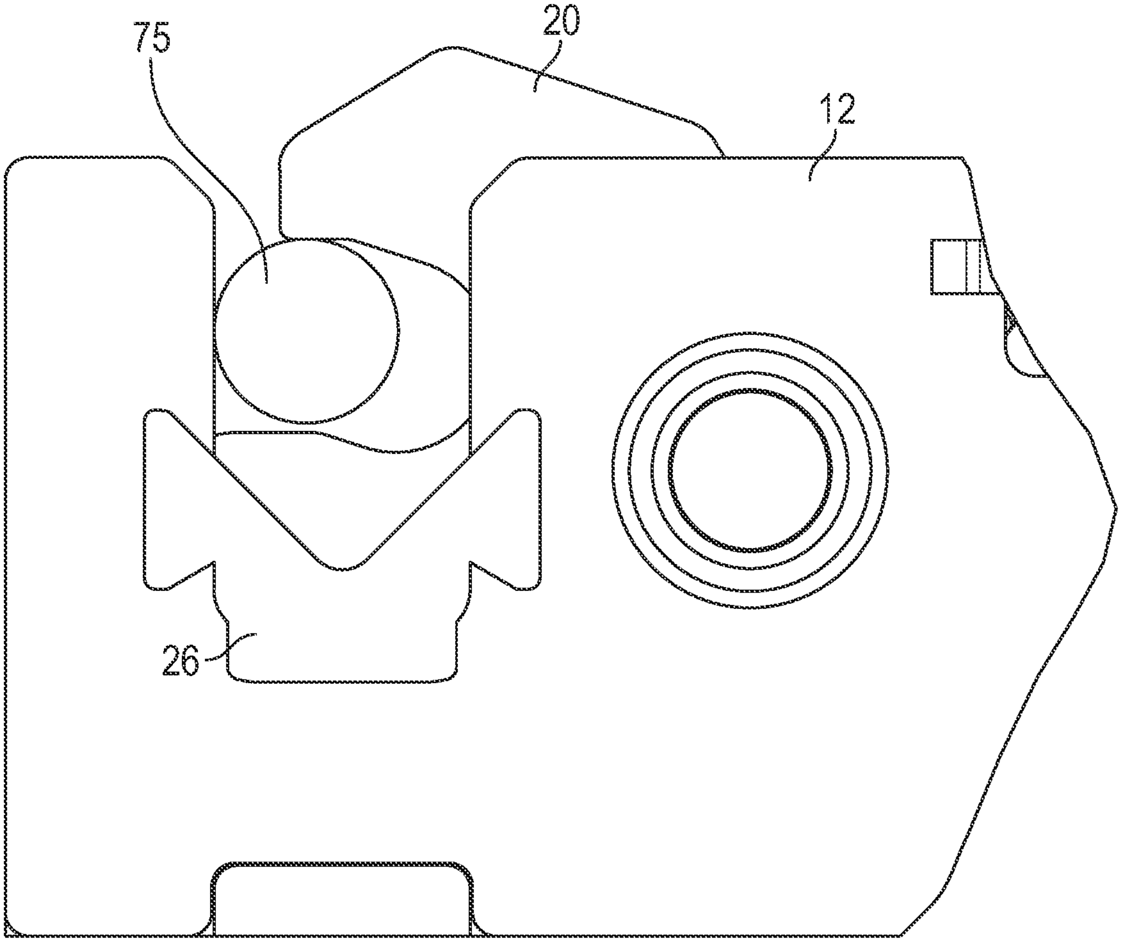
FIG. 32 is a partial back view showing the rotor in the secondary position and the striker in the rotor in-pocket position preventing the striker from wedging in the opening between the latch plates and rotor.

A latch assembly 10 is intended for use on a vehicle door to control the opening and closing of the door. The latch assembly 10 includes a front plate 12 and a back plate 14, and a pair of axles 16, 18 extending between the plates 12, 14 to connect the plates 12, 14 together. The first and second axles 16, 18 can be secured to the plates 12, 14 in any convenient manner, such as staking or swedging.

A rotor 20 is mounted on the second axle 18, and a catch 22 is mounted on the first axle 16. The rotor 20 and catch 22 pivot in reciprocal manners on their respective axles. When the rotor 20 is in an open position, the rotor is adapted to receive a striker 75 on the vehicle door frame, and then pivot to a closed position as the door is fully closed, thereby capturing the striker 75 and maintaining the door in the closed position. When the catch 22 is actuated, a finger 23 of the catch disengages from a finger 21 on the rotor to release the rotor from its closed position for spring biased movement to its open position, wherein the striker 75 is released so that the door can be opened. Springs 24 are mounted on the axles 16, 18 and have ends engaging the rotor 20 and catch 22, so as to bias the rotor and the catch in their open positions.

In a preferred embodiment, the spring 24 is a double torsion spring formed from a single piece of wire, with the opposite ends being wound in opposite clockwise and counterclockwise directions. A V-shaped notch or transition 27 is formed in the wire between the opposite ends. The notch 27 isolates the spring force at each end, and thereby prevents transmission of forces between the rotor and the catch, so that the rotor and catch rotate independently of one another.

A bumper 26 is sandwiched between the front plate 12 and the back plate 14. The bumper 26 is to provide a soft opening and closing of the rotor 20, as described below.

The actuator 28 is mounted on the plates 12, 14 for reciprocal pivotal motion. A first trip lever 30 is mounted to the plates 12, 14 with a pin or rivet 32 for reciprocal pivotal movement. A second trip lever 34 is mounted to the barrel actuator 28 with a screw 36 for reciprocal pivotal movement.

The bumper 26 is made of a soft sound absorbing material, such as rubber. The bumper 26 includes a body 38, a first tab 40, and a second tab 42. The tabs 40, 42 are received within the notches 44, 46 and the plates 12, 14, respectively. Receipt of the tabs 40, 42 in the notches 44, 46 retains the bumper 26 in position between the plates 12, 14. The body 38 of the bumper 26 has a curved surface 39 to substantially match the curvature on the bottom edge of a rotor leg 25 which engages the surface 39 when the rotor 20 moves to the closed position, thereby dampening or muffling the sound so as to provide a soft closing for the rotor. The bumper body 38 has a second damping area 47 which engages a tab 49 on the rotor 20 when the rotor moves to the open position, thereby dampening the sound of such engagement to provide a soft opening of the rotor 20. The bumper body 38 also includes a V or U shaped notch 48 adapted to receive the striker 75 when the door is fully closed. Engagement of the striker 75 with the bumper 26 eliminates any rattle noise for the latch, for example, when the vehicle is moving.

The barrel actuator 28 includes a body 50 having a shoulder 52 and resilient tabs 54 extending from one end of the barrel actuator 28. Each tab 54 has a fixed end 56 and a free end 58. The free ends 58 are spaced from the shoulder 52 a distance greater than the thickness of the plate 14. The barrel actuator 28 is designed to be mounted to the first or back plate 14 by pushing the legs 55 through a hole 60 in the back plate 14. The tabs 54 are resilient and compressed as the actuator 28 is pushed through the hole 60. As the tabs 54 are completely pushed through the hole 60, the tabs spring outwardly so as to sandwich the first or back plate 14 between the shoulder 52 and the tabs 54. This snap fit assembly of the actuator 28 and plate 14 eliminates the need for a mounting clip, as in prior art latches. The barrel 28 includes a torsional brace 61 to provide strength, and to prevent the tabs 54 from shearing off under torsional load.

The first end 62 of the actuator 28 extends into a key hole 64 in the second or front plate 12. The opposite end or head 66 of the actuator 28 includes a projection 67. The second trip lever 34 has a slot 68 with the shape matching the projection 67 for projection. Actuation of the trip lever 34 rotates the barrel 28, which in turn pivots the catch 22 when the striker 75 is captured in the rotor. The front plate 12 includes a detent 70 to stop rotation of the catch 22 as the catch moves via bias of the spring 24 to the open position.

The embodiments, variations, and figures described above are provided as an indication of the utility and versatility of the present invention. Other embodiments that do not provide or otherwise utilize all of the features, processes and advantages set forth herein may also be utilized, without departing from the spirit and scope of the present invention. Such modifications and variations are considered to be within the scope of the principles of the invention as defined by the claims set forth below.

What is claimed is:

1. A latch assembly for a door pivotally mounted to a door frame on a vehicle, comprising:

first and second latch plates connected together by first and second axles;

a catch mounted on the first axle for reciprocal rotation;

a rotor mounted on the second axle for reciprocal rotation between a closed position adapted to capture a striker on the door frame of the vehicle and an open position to release the striker;

a bumper mounted to the first and second latch plates to engage the rotor in both the open and closed positions and thereby dampen sound from the rotor when the rotor moves to the open and closed positions, the bumper having a first portion to engage the rotor in the open position, a second portion to engage the rotor in the closed position, and a third portion adapted to engage the striker when the rotor is in the closed position;

the third portion of the bumper being a V-shaped notch adapted to contact the striker at two points; and the bumper having a body residing between the plates and first and second tabs extending in opposite directions for retentive engagement with notches in the first and second plates, respectively.

2. The latch assembly of claim 1 wherein the bumper engages the striker when the rotor is moved to the closed position to dampen rattling sound between the rotor and the striker.

3. The latch assembly of claim 1 further comprising a barrel actuator extending between the plates with a snap fit retention to one of the plates.

4. The latch assembly of claim 3 wherein the barrel actuator has a pair of resilient legs and one of the plates has a hole through which the legs extend.

5. The latch assembly of claim 4 wherein each leg terminates in a shoulder which retentively engages the one plate.

6. The latch assembly of claim 5 wherein the legs move between a compressed position to pass through the hole and an expanded position to retain the barrel actuator between the plates.

7. An improved latch assembly for a door, the latch assembly having a rotor and a catch mounted in a housing each for reciprocal movement, and the door having a striker, the improvement comprising:

a bumper mounted in the housing to engage the rotor in open and closed positions to dampen rotor noise, and to engage the striker to dampen striker noise when the door is closed;

the bumper having tabs extending in opposite directions to extend into openings on opposite sides of the housing, respectively, for mounting the bumper in the latch assembly.

8. The improved latch assembly of claim 7, wherein the bumper has first, second, and third portions to respectively engage the rotor in open and closed positions and the striker when the door is closed.

9. The improved latch assembly of claim 7 wherein the bumper has a V-shaped notch to engage the striker at two spaced-apart points.

10. A latch assembly for a door pivotally mounted to a door frame on a vehicle, comprising:

first and second latch plates connected together by first and second axles;

a catch mounted on the first axle for reciprocal rotation;

a rotor mounted on the second axle for reciprocal rotation between a closed position adapted to capture a striker on the door frame of the vehicle and an open position to release the striker;

a bumper mounted to the first and second latch plates to engage the rotor in both the open and closed positions and thereby dampen sound from the rotor when the rotor moves to the open and closed positions, the bumper having a first portion to engage the rotor in the open position, a second portion to engage the rotor in the closed position, and a third portion adapted to engage the striker when the rotor is in the closed position;

the third portion of the bumper being a V-shaped notch adapted to contact the striker at two points; and a barrel actuator extending between the plates with a snap fit retention to one of the plates.

11. The latch assembly of claim 10 wherein the barrel actuator has a pair of resilient legs and one of the plates has a hole through which the legs extend.

12. The latch assembly of claim 11 wherein each leg terminates in a shoulder which retentively engages the one plate.

13. The latch assembly of claim 12 wherein the legs move between a compressed position to pass through the hole and an expanded position to retain the barrel actuator between the plates.

* * * * *